United States Patent
Kocaman et al.

(10) Patent No.: US 7,991,101 B2
(45) Date of Patent: Aug. 2, 2011

(54) MULTIPLE CHANNEL SYNCHRONIZED CLOCK GENERATION SCHEME

(75) Inventors: Namik K. Kocaman, Irvine, CA (US); Afshin Momtaz, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 1176 days.

(21) Appl. No.: 11/705,316

(22) Filed: Feb. 12, 2007

(65) Prior Publication Data

US 2008/0152062 A1    Jun. 26, 2008

Related U.S. Application Data

(60) Provisional application No. 60/876,075, filed on Dec. 20, 2006.

(51) Int. Cl.
*H04L 7/02* (2006.01)
(52) U.S. Cl. ......... 375/359; 375/354; 375/355; 375/356
(58) Field of Classification Search .................. 375/359, 375/354, 355, 356; 370/503; 327/141; 714/12
See application file for complete search history.

(56) References Cited

U.S. PATENT DOCUMENTS

| | | | |
|---|---|---|---|
| 5,488,639 A * | 1/1996 | MacWilliams et al. | 375/355 |
| 5,910,964 A * | 6/1999 | Sugita | 375/130 |
| 5,949,262 A * | 9/1999 | Dreps et al. | 327/156 |
| 6,894,551 B2 * | 5/2005 | Johnson | 327/258 |
| 7,030,674 B2 * | 4/2006 | Johnson | 327/258 |
| 7,573,937 B2 * | 8/2009 | Baumgartner et al. | 375/226 |
| 7,605,665 B2 * | 10/2009 | Chambers et al. | 331/16 |
| 2003/0031133 A1 * | 2/2003 | Momtaz | 370/241 |
| 2003/0117960 A1 * | 6/2003 | Quinlan et al. | 370/241 |
| 2006/0119408 A1 * | 6/2006 | Chan et al. | 327/291 |
| 2006/0164132 A1 * | 7/2006 | Martin et al. | 327/105 |
| 2007/0164835 A1 * | 7/2007 | Co | 332/144 |
| 2008/0018406 A1 * | 1/2008 | Fallahi et al. | 331/2 |
| 2008/0049885 A1 * | 2/2008 | Inamdar | 375/376 |
| 2008/0224910 A1 * | 9/2008 | Chen | 341/144 |

* cited by examiner

*Primary Examiner* — Shuwang Liu
*Assistant Examiner* — Helene Tayong
(74) *Attorney, Agent, or Firm* — Garlick Harrison & Markison; Shayne X. Short

(57) ABSTRACT

Multiple channel synchronized clock generation scheme. A novel approach is presented herein in which synchronized clock signals are generated that can be used in parallel processing of deserialized signals. When a serial input signal is received, it can be deserialized into a plurality of parallel signals, and each of these parallel signals can be processed at a frequency that is lower than the frequency of the serial signal. Overall, the frequency at which all of the parallel signals are processed can be the same or substantially close to the frequency of the serial signal, so that throughput within a communication system is not compromised or undesirably reduced. This novel approach is operable to perform independent adjustment of the operational parameters within an apparatus that is operable to perform multiple channel synchronized clock generation (e.g., phase rotation and/or division of signals within each of the individual channels can be adjusted independently).

20 Claims, 18 Drawing Sheets

MULTIPLE CHANNEL SYNCHRONIZED CLOCK GENERATION SCHEME

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional Patent Application which is hereby incorporated herein by reference in its entirety and made part of the present U.S. Utility patent application for all purposes:

1. U.S. Provisional Application Ser. No. 60/876,075, entitled "Multiple channel synchronized clock generation scheme," filed Dec. 20, 2006.

BACKGROUND OF THE INVENTION

1. Technical Field of the Invention

The invention relates generally to communication systems; and, more particularly, it relates to communication system in which parallel processing of signal is performed such as in the context of de-serialization and/or serialization.

2. Description of Related Art

Data communication systems have been under continual development for many years. In many communication systems and signal conditioning systems (e.g., including those that employ one or more serial communication links), the incoming data might be de-multiplexed into multiple channels to utilize the advantage of parallel processing at lower frequency of operation. The clocking scheme for each de-multiplexed channel has to start from a predetermined condition and be synchronized such that serial data ordering can be kept unaltered through the demultiplexed multiple channels.

Generally speaking, a serial signal can be de-serialized into a number of parallel signals such that the entirety of the parallel signals includes all of the information within the serial signal. Because of this parallel arrangement, these desserialized signals can be processed in parallel. This requires the synchronization described above, so that the parallel signals are all processed appropriately. Prior art approaches to performing the generation of the synchronized clock signals to be used for each of the parallel signals have a number of deficiencies.

FIG. 4 illustrates a prior art approach 400 of synchronized clock signal generation for 8 channels. In the prior art approach 400, one can utilize a single phase rotator 413 to generate the clock outputs (i.e., CLK1, and CLK1B) using 4 separate D latches, shown as reference numerals 410, 420, 430, and 440, respectively.

In addition, one very inflexible characteristic of this prior art approach 400 is the duty cycle distortion which inherently results within the output of each channel. Moreover, this prior art approach 400 only works for an 8-channel system where CLK1 is four times the speed of clock signals CLK<0:7> (e.g., shown as CLK<0>, CLK<1>, CLK<2>, and so on up to CLK<7>). This prior art approach 400 also is not modular to any number of channels; more specifically, this prior art approach 400 can only be applied to a system that employs an even number of synchronized clock signals (i.e., it cannot accommodate odd numbers of channels).

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
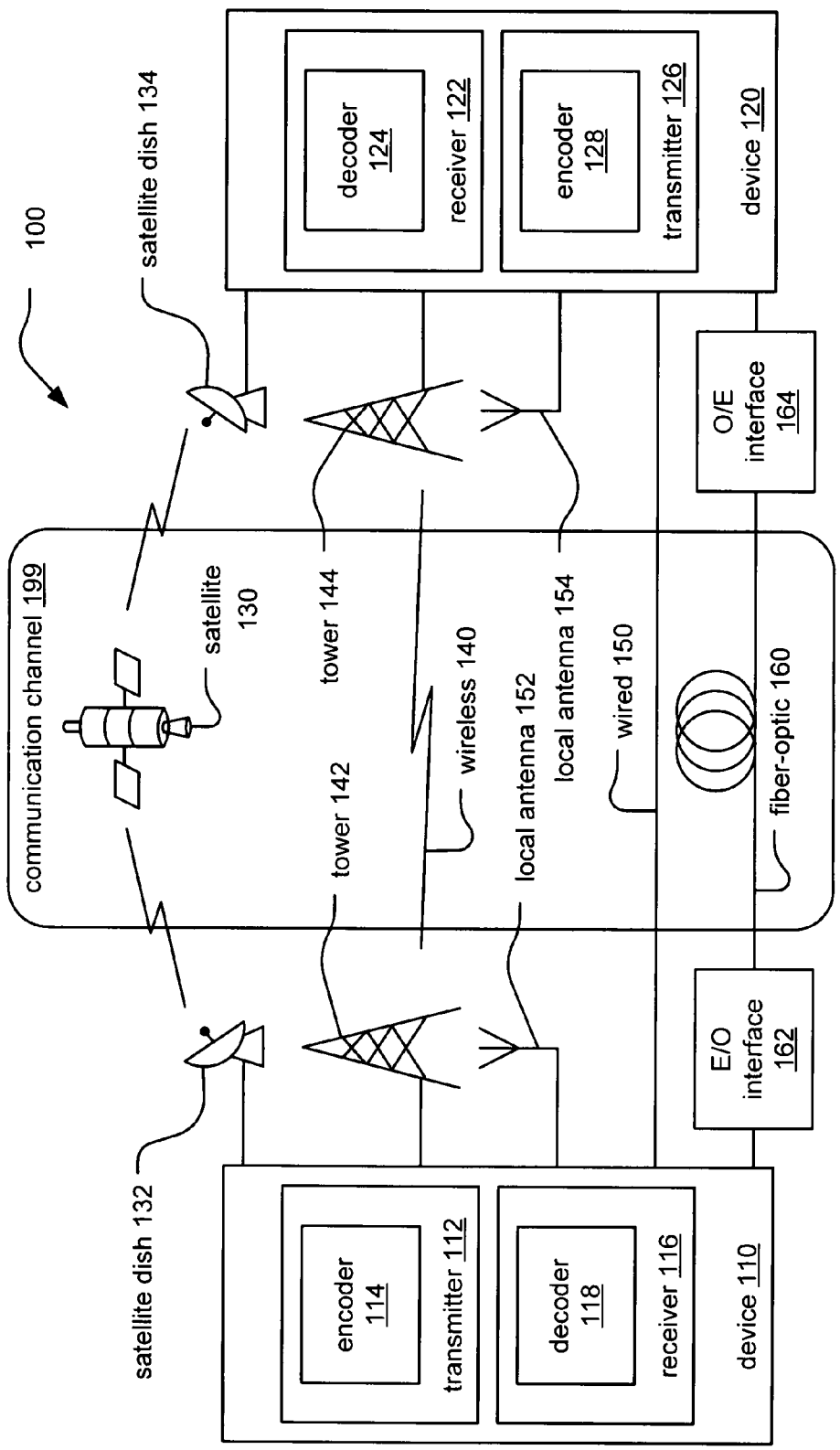
FIG. 1 illustrates an embodiment of a communication system.

The goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and other types of media as well.

FIG. 1 is a diagram illustrating an embodiment of a communication system 100.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

The various aspects of the invention presented herein which include the ability to generate clock signals for use in systems that employ various aspect of deserialization of a serial signal into a plurality of parallel signals. Generally speaking, a novel means is presented herein by which a multiple channel synchronized clock generation scheme is operable to align the output clock of each channel with respect to its predecessor and successor channels.

Herein, the terms processing module, module, device, and/or functional blocks are sometimes employed. Generally speaking, these items can be referred to as a processing module. A processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. A memory (which can be coupled to or implemented within the processing module) may be a single memory device or a plurality of memory devices. Such a memory device may be a read-only memory, random access memory, volatile memory, non-volatile memory, static memory, dynamic memory, flash memory, and/or any device that stores digital information. It is noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory stores, and the processing module executes, operational instructions corresponding to at least some of the steps and/or functions illustrated herein within the appropriate embodiment or embodiments.

Figure 2:
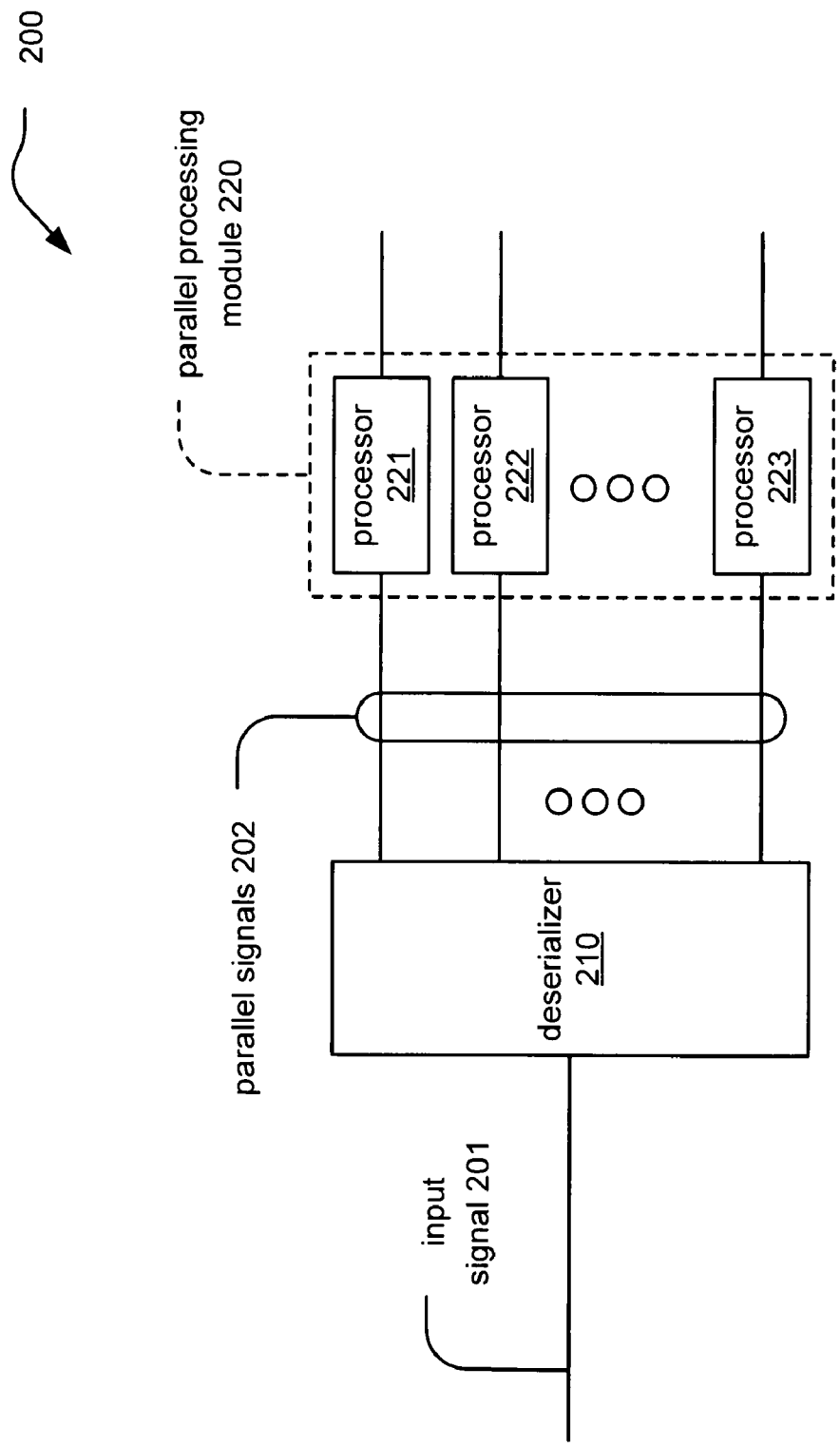
FIG. 2 illustrates an embodiment of a communication system in which deserialization is performed.

FIG. 2 illustrates an embodiment of a communication system 200 in which deserialization is performed. An input signal 201 is received by a deserializer 210. The deserializer 210 is operable to generate a plurality of parallel signals 202 that corporately include all of the information within the input signal 201. In other words, any data within the input signal 201 remains unaltered but is represented differently with respect to time (i.e., in a parallel manner) within the plurality of parallel signals 202.

A parallel processing module 220 then is operable to process the plurality of parallel signals 202. If desired, the parallel processing module 220 is partitioned into a plurality of processors as shown by processor 221, processor 222, ... , and processor 223. Any desired number of signals within the plurality of parallel signals 202 and any desired number of processors within the parallel processing module 220 can be employed in a particular application. Generally speaking, within embodiments that employ the parallel processing module 220 when partitioned into the plurality of processors, the number of processors within the parallel processing module 220 can be designed to correspond to the number of signals within the plurality of parallel signals 202.

Analogous to the deserialization within the communication system 200, serialization can also be performed to the plurality of parallel signals 202 (or to another set of parallel signals) to generate a serial signal. Oftentimes within communication systems, both serialization and de-serialization are performed to convert signals from serial form to parallel form, and vice versa.

This capability to perform conversion of a serial signal to parallel signals, and vice versa, allows the opportunity to perform parallel processing of the parallel signals. If desired, the processing of the parallel signals can be performed at a frequency that is different than the frequency at which the serial signal is processed. In some embodiments, the processing of the parallel signals is performed at a frequency that is lower than the frequency at which the serial signal is processed.

Figure 3:
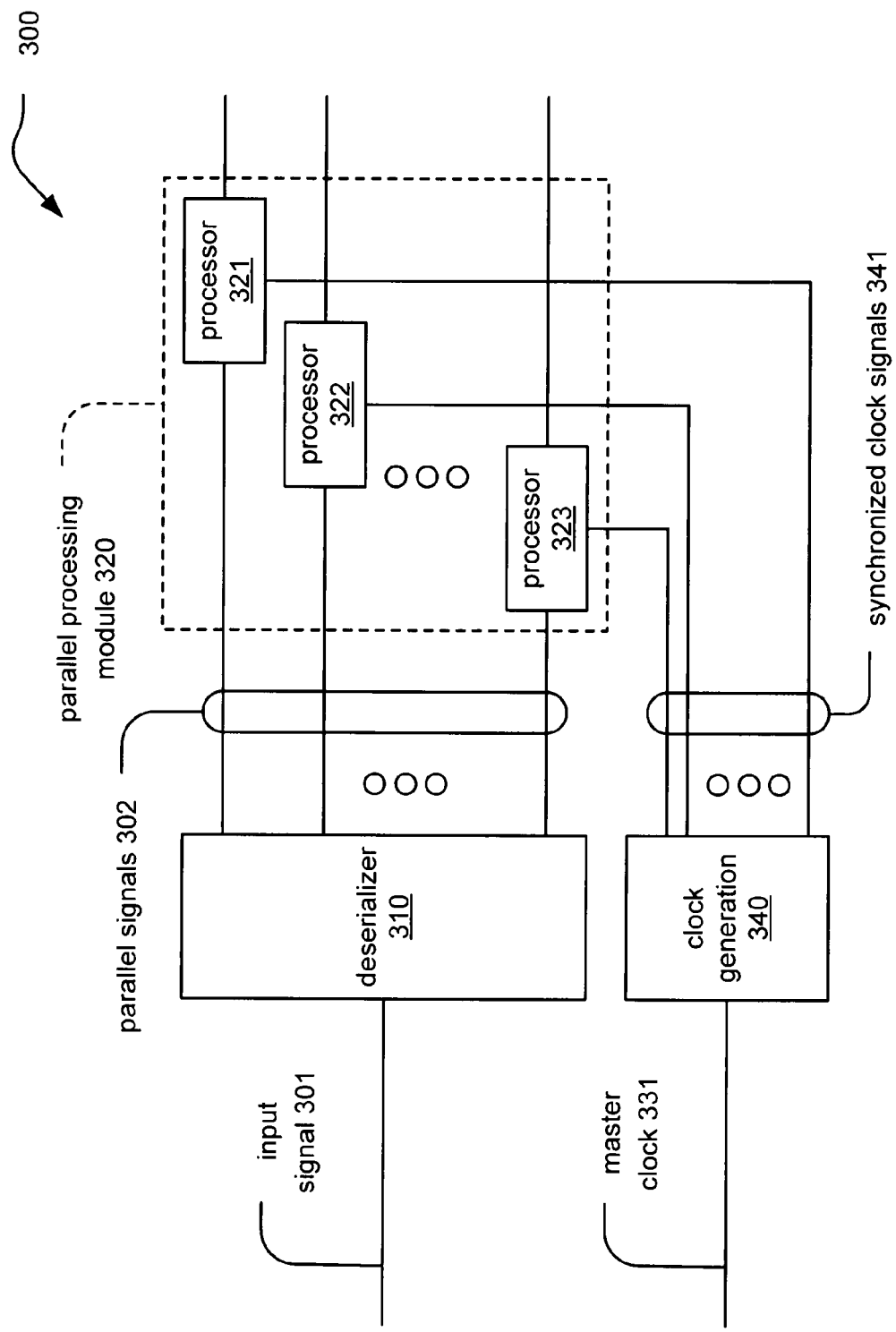
FIG. 3 illustrates another embodiment of a communication system in which deserialization is performed, and also specifically shows synchronized clock signals employed therein.

FIG. 3 illustrates another embodiment of a communication system 300 in which deserialization is performed, and also specifically shows synchronized clock signals employed therein. This embodiment is somewhat analogous to the previous embodiment.

An input signal 301 is received by a deserializer 310. The deserializer 310 is operable to generate a plurality of parallel signals 302 that corporately include all of the information within the input signal 301. In other words, any data within the input signal 301 remains unaltered but is represented differently with respect to time (i.e., in a parallel manner) within the plurality of parallel signals 302.

A parallel processing module 320 then is operable to process the plurality of parallel signals 302. If desired, the parallel processing module 320 is partitioned into a plurality of processors as shown by processor 321, processor 322, ... , and processor 323. Any desired number of signals within the plurality of parallel signals 302 and any desired number of processors within the parallel processing module 320 can be employed in a particular application. Generally speaking, within embodiments that employ the parallel processing module 320 when partitioned into the plurality of processors, the number of processors within the parallel processing module 320 can be designed to correspond to the number of signals within the plurality of parallel signals 302.

Analogous to the deserialization within the communication system 300, serialization can also be performed to the plurality of parallel signals 302 (or to another set of parallel signals) to generate a serial signal. Oftentimes within communication systems, both serialization and de-serialization are performed to convert signals from serial form to parallel form, and vice versa.

In addition, as with the previous embodiment, this capability to perform conversion of a serial signal to parallel signals, and vice versa, allows the opportunity to perform parallel processing of the parallel signals. If desired, the processing of the parallel signals can be performed at a frequency that is different than the frequency at which the serial signal is processed. In some embodiments, the processing of the parallel signals is performed at a frequency that is lower than the frequency at which the serial signal is processed.

An apparatus implemented within the communication system 300 also includes a clock generation module that is operable to receive a master clock 331 and to generate a plurality of synchronized clock signals 341 that are then provided to the parallel processing module 320. Generally speaking, within embodiments that employ the parallel processing module 320 when partitioned into the plurality of processors, the number of processors within the parallel processing module 320 can be designed to correspond to the number of signals within the plurality of parallel signals 302, and the number of clock signals within the plurality of synchronized clock signals 341 can also be designed to correspond to the number of signals within the plurality of parallel signals 302 as well as the number of processors within the parallel processing module 320.

This embodiment provides a means by which each signal within the plurality of parallel signals (e.g., corresponding to each channel) starts from a predetermined condition and is synchronized such that serial data ordering (e.g., of the input signal 301) is kept unaltered through the demultiplexed/deserialized multiple channels (e.g., parallel signal 302) that is processed within the parallel processing module 320.

Figure 5:
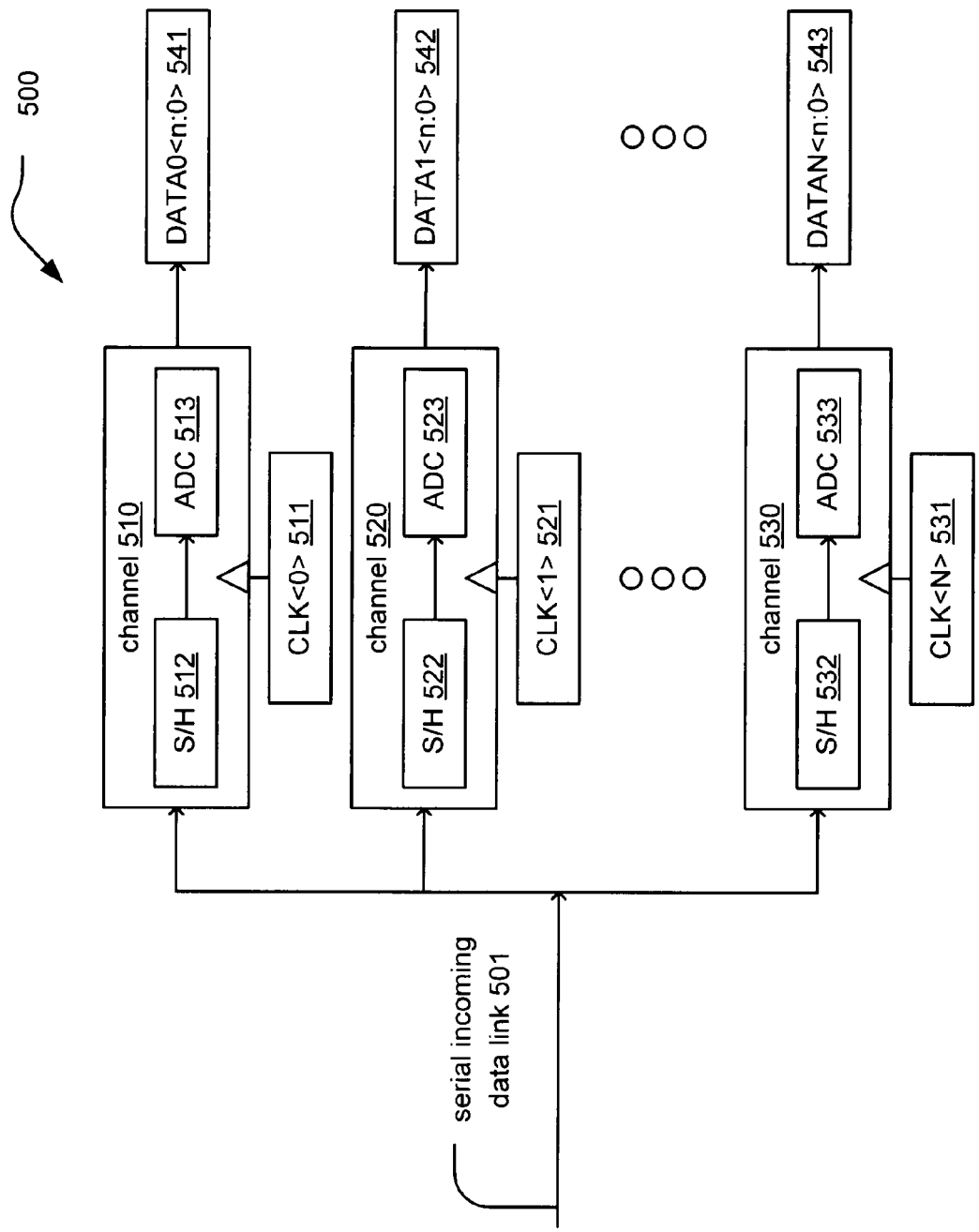
FIG. 5 illustrates an embodiment of deserialization of a serial incoming data link into multiple channels to utilize parallel processing.

FIG. 5 illustrates an embodiment of deserialization 500 of a serial incoming data link into multiple channels to utilize parallel processing.

As depicted in FIG. 5, "N+1" (e.g., where "N+1" is eight (8) in some embodiments) parallel channels have been utilized to demultiplex a serial incoming data link 501 (i.e., channel 0, channel 1, channel 2, and up to channel N for N+1 total channels). As a general example, each channel "k", where $0 \leq k \leq N$, can consist of a sample and hold (S/H) circuitry followed by an analog to digital converter (ADC). Looking at the diagram, a $0^{th}$ channel 510 includes S/H circuitry 512 followed by ADC 513; a $1^{st}$ channel 520 includes S/H circuitry 522 followed by ADC 523; . . . ; and an $N^{th}$ channel 530 includes S/H circuitry 532 followed by ADC 533. For each of the channels, both the corresponding S/H circuitry and ADC circuitry are clocked by CLK<k>. Looking at the diagram, the $0^{th}$ channel 510 is clocked by CLK<0> 511; the $1^{st}$ channel 520 is clocked by CLK<1> 521; and the $N^{th}$ channel 530 is clocked by CLK<N> 531.

Using parallelism at a lower frequency of operation, CLK<k> can be $1/(N+1)^{th}$ of the baud rate of the serial incoming data link 501. In other words, the serial incoming data link 501 has a first frequency and each of the parallel signals processed within the "N+1" parallel channels 510-530 is at a second frequency (e.g., a lower frequency) than the frequency of the serial incoming data link 501. When operating at lower speeds, it is oftentimes easier to design circuits that are operable to achieve higher performance and lower power.

The $0^{th}$ channel 510 is operable to process its particular signal within the parallel signals to generate signal DATA0<n:0> 541; the $1^{st}$ channel 520 is operable to process its particular signal within the parallel signals to generate signal DATA1<n:0> 542; and the $N^{th}$ channel 530 is operable to process its particular signal within the parallel signals to generate signal DATAN<n:0> 543.

Figure 6:
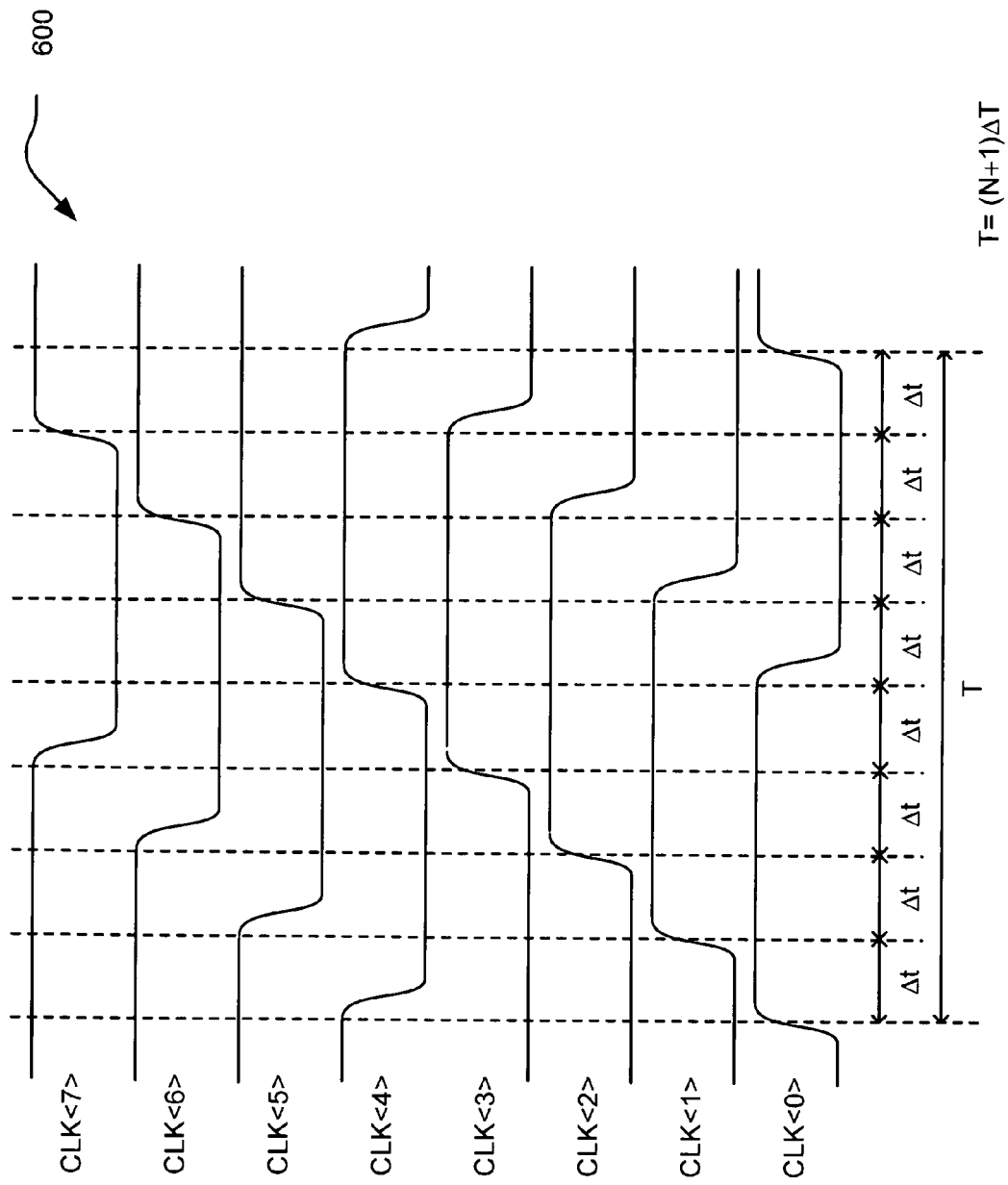
FIG. 6 illustrates an embodiment of timing relations among various clock signals within a system employing multiple channel synchronized clocks.

FIG. 6 illustrates an embodiment of timing relations 600 among various clock signals within a system employing multiple channel synchronized clocks. As depicted in FIG. 6, the timing relations among CLK<0:N> are shown (e.g., where N=7 and N+1=8 in this particular embodiment, but can be selected to by any desired number, including both odd and even numbers). The timing relations among CLK<0:N> can be stated as follows; the positive edge of CLK<k>, where $1 \leq k \leq (N-1)$, lags the positive edge of CLK<k-1> by $\Delta t$, and leads the positive edge of CLK<k+1> by $\Delta t$. Similarly, the negative edge of CLK<k>, where $1 \leq k \leq (N-1)$, lags the negative edge of CLK<k-1> by $\Delta t$, and leads the negative edge of CLK<k+1> by $\Delta t$. If T corresponds to the period of CLK<k>, where $0 \leq k \leq N$, then T is equal to $(N+1)\Delta t$.

Figure 7:
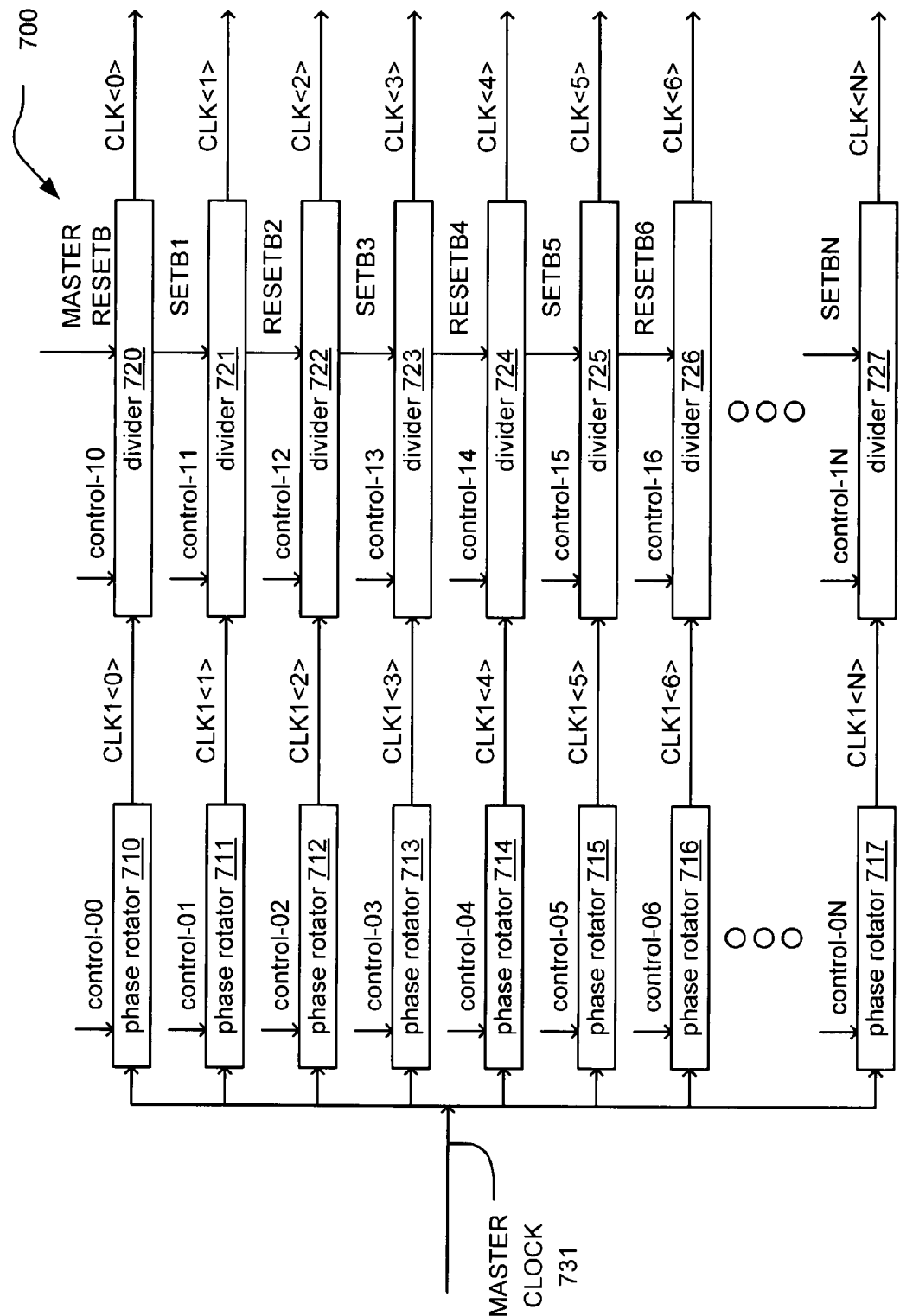
FIG. 7 illustrates an embodiment of an apparatus that is operable to perform multiple channel clock generation.

FIG. 7 illustrates an embodiment of an apparatus 700 that is operable to perform multiple channel clock generation. In this diagram, one particular embodiment of a block diagram of the multiple channel synchronized clock generation scheme can be seen.

Without loss of generality, the signal lines MASTER CLOCK 731, "N" clock signals CLK1<0:N> each of which can have a width of "n" bits (e.g., these clock signals are shown as CLK1<0>, CLK1<2>, CLK1<3>, CLK1<4>, CLK1<5>, CLK1<6>, . . . , and CLK1<N>) and the "N" clock signals CLK<0:N> that have been generated by dividing down each of the "N" clock signals CLK1<0:N> by a divisor of "m" (e.g., shown as CLK<0>, CLK<2>, CLK<3>, CLK<4>, CLK<5>, CLK<6>, and CLK<N>) can be differential or single ended.

For the sake of illustration for the reader, single ended lines are depicted but it is noted that differential signals could also be employed without departing from the scope and spirit of the invention. Also, in some embodiments, the number of clock signals CLK1<0:N> is 8 clock signals, and the number of clock signals CLK<0:N> is also 8 clock signals (i.e., where N=7 and N+1=8, where "m" is the divide down factor, i.e., where the frequency of each of the clock signals CLK<0:N> is "1/m" of the frequency of each of the clock signals CLK1<0:N>).

MASTER CLOCK 731 is used to provide the input reference frequency for each of "N" phase rotators (e.g., shown as phase rotator 710, phase rotator 711, phase rotator 712, phase rotator 713, phase rotator 714, phase rotator 715, phase rotator 716, . . . , and the "$N^{th}$" phase rotator 717). Each phase rotator is operable to output a phase shifted version of the input frequency that it receives.

In addition, using dedicated and independently controlled phase rotators for each channel gives the maximum flexibility for the data recovery system design. For example, control signals (control-00, control-01, control-02, control-03, control-04, control-05, control-06, . . . , and control-0N) are provided to each of the phase rotators to allow individual, independent control of the phase rotation employed by each of them.

Although one can try to match the delays on the output clocks of the channels, there typically will be some random mismatches due to process variations across the die and systematic mismatches such as layout asymmetries and supply variations. These delay mismatches among the clocks can be compensated by using dedicated and independently controlled phase rotators for each channel.

The control inputs to each of the phase rotators (e.g., control-00 to control-0N) is used to adjust the amount of phase shifting. Without loss of generality, the control input to each of these phase rotators can be analog or digital. If the control input is digital, it can be adjusted through digital logic or microprocessor. If the initial conditions of the control inputs are set appropriately, the timing relation among clock signals CLK1<0:7> can be controlled to achieve a predetermined condition.

The "N" clock signals CLK1<0:N> are then output from each of the phase rotators and are then provided to a plurality of dividers (e.g., shown as divider 720, divider 721, divider 722, divider 723, divider 724, divider 725, divider 726, . . . , and the $N^{th}$ divider 727). Again, each of the dividers 720-727 can be operable to employ a divisor of "m"; alternatively, each of the dividers 720-727 can be operable to employ an independently controlled divisor.

Analogous to the independent control and operation of the phase rotators 710-717, using dedicated and independently controlled divider for each channel gives the maximum flexibility for the data recovery system design. For example, control signals (control-10, control-11, control-12, control-13, control-14, control-15, control-16, . . . , and control-1N) are provided to each of the dividers 720-727 to allow individual, independent control of the divisor employed by each of them when performing division of the "N" clock signals CLK1<0:N> (e.g., shown as CLK1<0>, CLK1<2>, CLK1<3>, CLK1<4>, CLK1<5>, CLK1<6>, . . . , and CLK1<n>) to generate the "N" divided down clock signals CLK<0:N> each also having width of "n" bits (e.g., shown as CLK<0>, CLK<2>, CLK<3>, CLK<4>, CLK<5>, CLK<6>, . . . , and CLK<N>).

Figure 8:
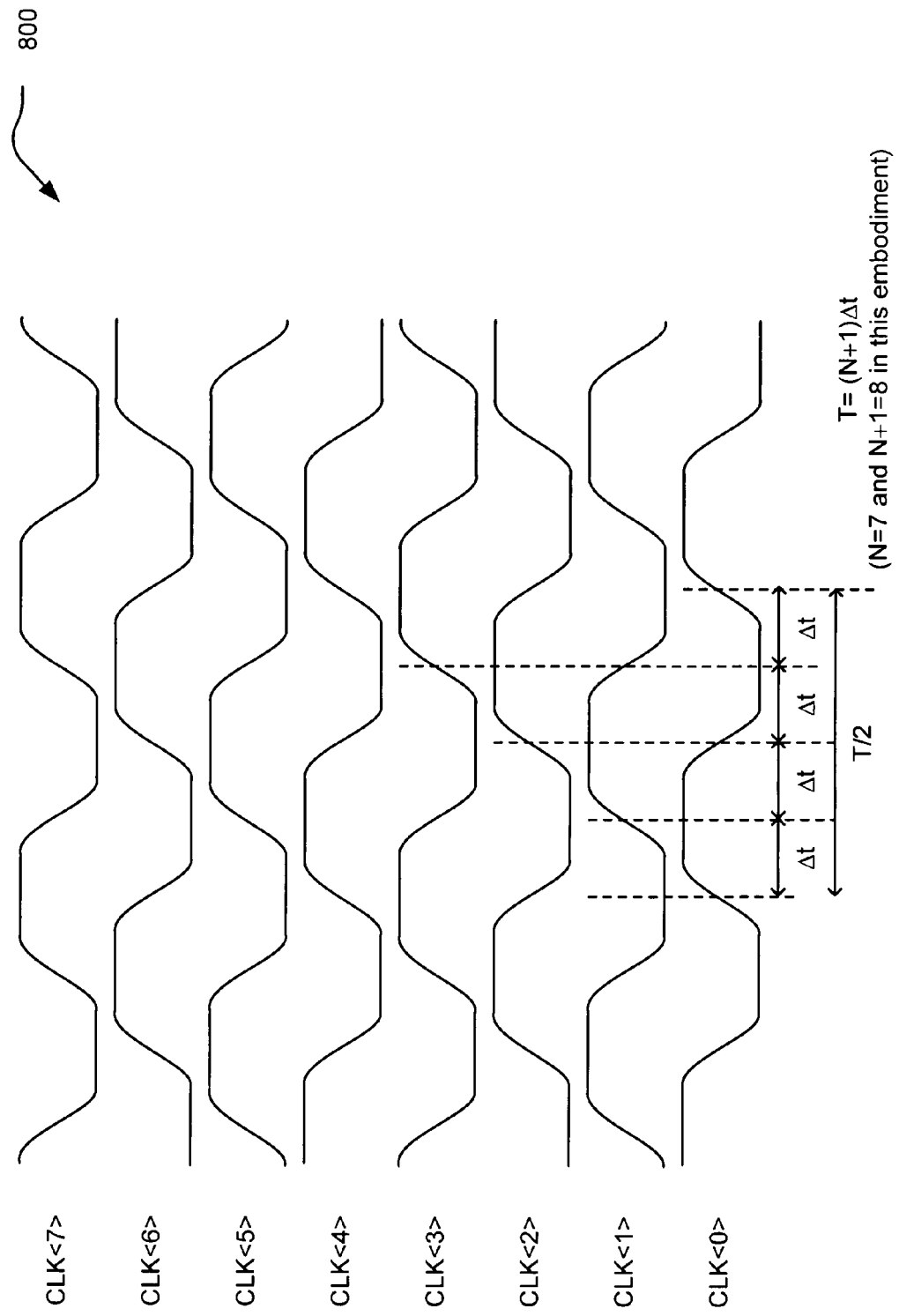
FIG. 8 illustrates another embodiment of timing relations among various clock signals within a system employing multiple channel synchronized clocks.

FIG. 8 illustrates another embodiment of timing relations 800 among various clock signals within a system employing multiple channel synchronized clocks. In this diagram, the timing relations among CLK1<0:N> (where N=7 and N+1=8 in this embodiment) can be seen.

Also, oftentimes the inherent operation of a phase rotator can introduce duty cycle distortion to its output. In certain embodiments, the following initial conditions are employed to ensure proper operation in view of this possible duty cycle distortion. This example employs an embodiment having 8 channels (i.e., where N=7 and N+1=8), and therefore, CLK1<0:N> is depicted as CLK1<0:7>; CLK<0:N> is depicted as CLK<0:7>; and there are 8 control signals ranging from control-00 to control-07. Also, it may be easier for the reader to follow this example when considering both FIG. 7 and FIG. 8 in conjunction.

CLK1<0:7> has a period of T/2. Each control signal of control-00 to control-07 has an 8-bit bus, and can take values from 0 up to 255.

In this instance, the initial conditions are as follows:
control-00=0 and CLK1<0> has a phase of 0 degree
control-01=64 and CLK1<1> has a phase of 90 degree
control-02=128 and CLK1<2> has a phase of 180 degree
control-03=192 and CLK1<3> has a phase of 270 degree
control-04=0 and CLK1<4> has a phase of 0 degree
control-05=64 and CLK1<5> has a phase of 90 degree
control-06=128 and CLK1<6> has a phase of 180 degree
control-07=192 and CLK1<7> has a phase of 270 degree It is also noted that CLK1<k> is identical to CLK1<k+4> where 0≦k≦3.

Although identical clocks are being generated, the implementation of dedicated phase rotators can ensure to cancel the delay mismatches among the channels.

Moreover, if additional buffers or differential to CMOS converters are utilized at the output of the phase rotators, further duty cycle distortion may added to clocks CLK1<0:7>. For the sake of simplicity in the diagram, the possible presence of buffers or differential to CMOS converters are not depicted in the diagram (though the reader should understand that they may be there). Having a process, supply, and temperature dependent duty cycle distortion on clock signals CLK1<0:7> is undesirable because it can degrade the performance of the S/H circuitries and the ADCs, and it can also possibly reduce the jitter tolerance and tracking performance of the communication link itself.

In order to correct for the duty cycle distortion, this embodiment employs single edge triggered divider circuits. Each of these dividers is also independently adjustable (analogous to the independent controllability of the phase rotators). If desired in some embodiments, DIVIDE BY 2 circuits can be employed. In this particular embodiment, the divisor employed by each divider is selectable. Looking particularly at the diagram, a control-10 signal controls the divisor employed by divider 720; a control-11 signal controls the divisor employed by divider 721; a control-12 signal controls the divisor employed by divider 722; and so on for all of the dividers. Moreover, it is noted that each of the dividers can employ the very same divisor 'm' in some embodiments. In the instance where the dividers are implemented as DIVIDE BY 2 dividers, then the divided down clocks (e.g., CLK<0: 7>) are half the rate of the clocks output from the phase rotators (e.g., CLK1<0:7>). In other words, the divided down clocks (e.g., CLK<0:7>) have a period of T while the clocks output from the phase rotators (e.g., CLK1<0:7>) have a period of T/2.

It is also noted that since dedicated phase rotators are employed for each channel, it is necessary to employ dedicated dividers for each channel to fix the duty cycle distortion. In order to achieve a certain timing relation among clock signals CLK<0:7> as depicted in FIG. 6, the dividers have to start from a pre-determined condition. Since the CLK1<0:7> signals are spaced with Δt, it is not feasible to use a single MASTER RESETB.

Figure 10:
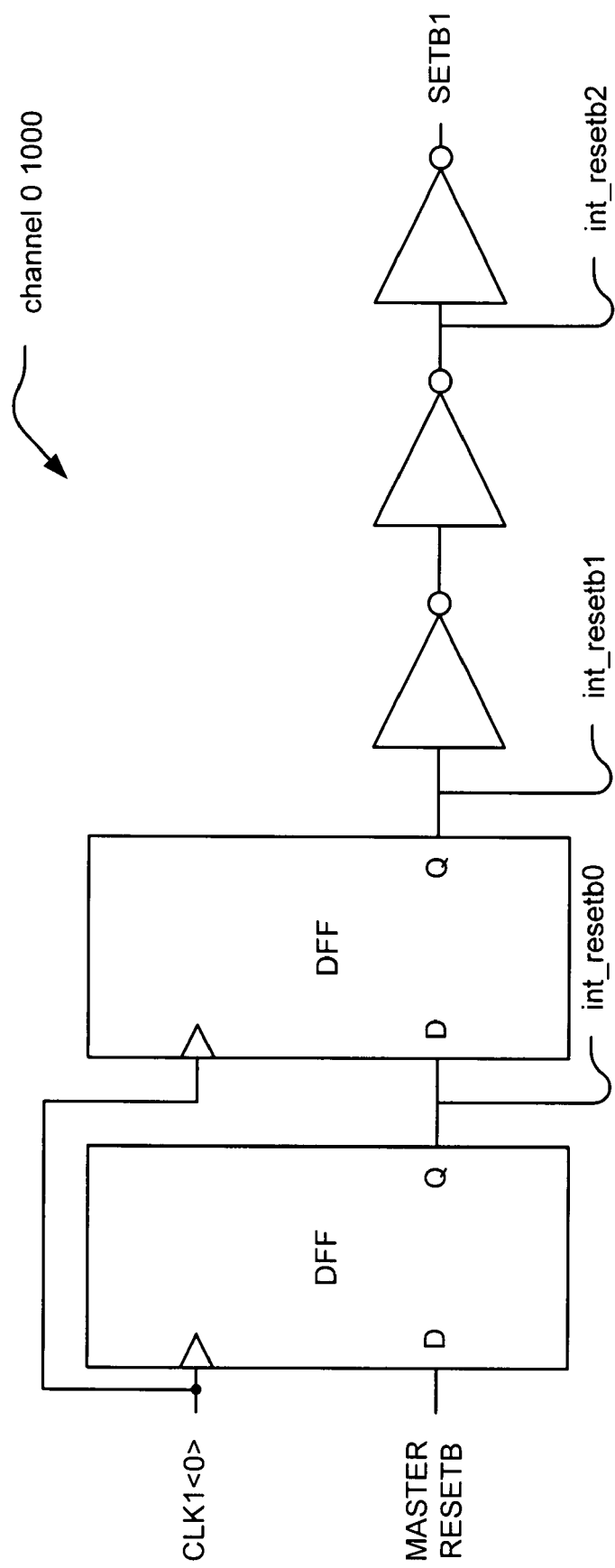

To deal with this instance, one novel aspect presented herein is to reset all of the channels sequentially. As depicted in FIG. 10, a single MASTER RESETB goes to only channel 0.

Figure 9:
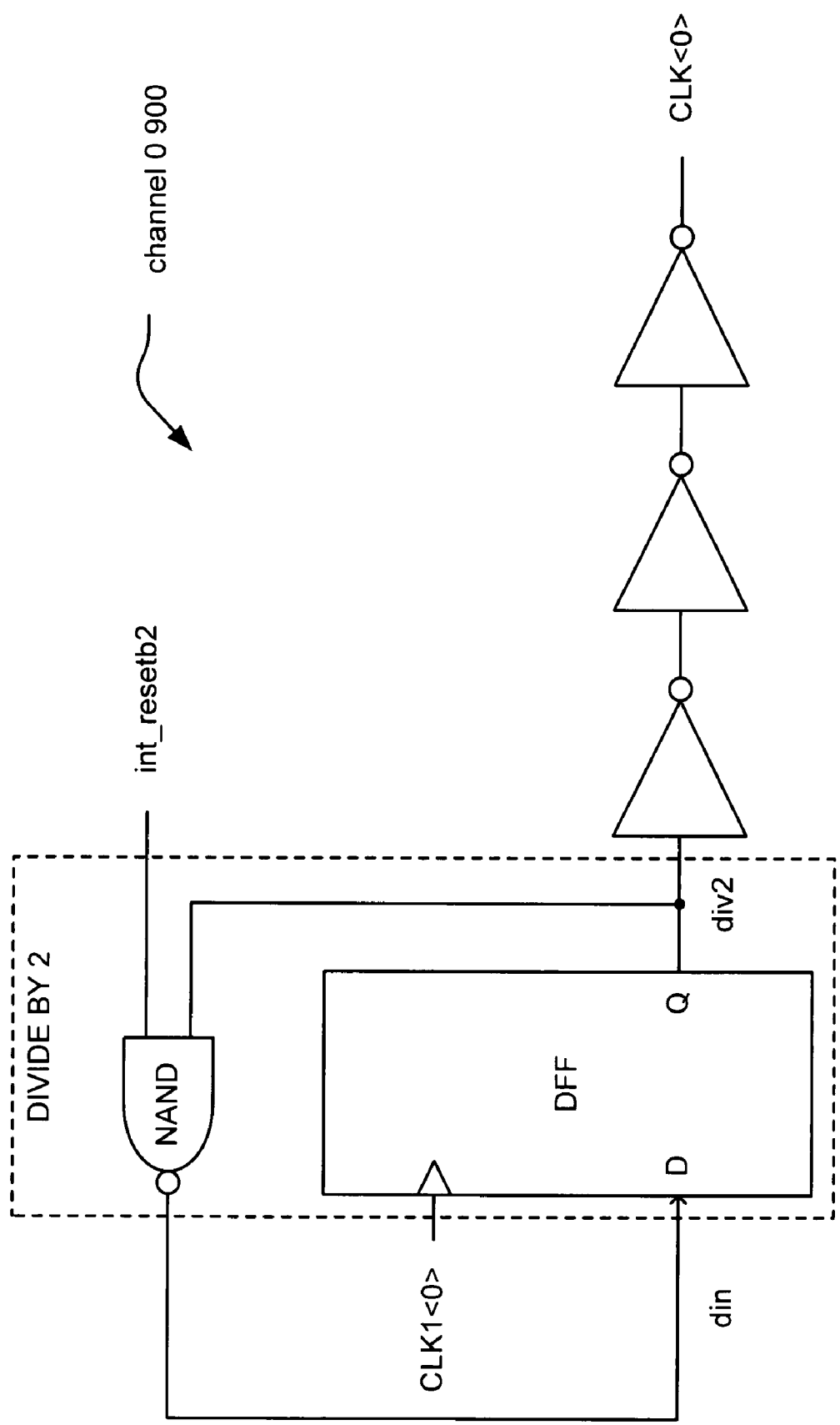
FIG. 9 and FIG. 10 illustrate embodiments of modules, devices, and/or functional blocks employed in the generation of a first clock signal within a system employing multiple channel synchronized clocks.

FIG. 9 and FIG. 10 illustrate embodiments 900 and 1000, respectively, of modules, devices, and/or functional blocks employed in the generation of a first clock signal within a system employing multiple channel synchronized clocks. FIG. 9 and FIG. 10 are to be considered in conjunction with one another.

Referring to FIG. 9 and FIG. 10, two back to back DFFs (Digital Flip-Flops) are used to sample the MASTER RESETB and generate "int_resetb2". The signal "int_resetb2" is used to initialize the DIVIDE BY 2 output signal, "div2". The inverted and delayed version of "int_resetb2" is SETB1, and it is sent to channel 1. CLK<0> is a delayed and inverted version of "div2", and it is sent as the clock output of channel 0. It is noted that that a NAND gate is used in the feedback path of the DFF which is used for DIVIDE BY 2. This ensures the initial state of "div2" to be LOGIC 1 (HIGH).

Figure 11:
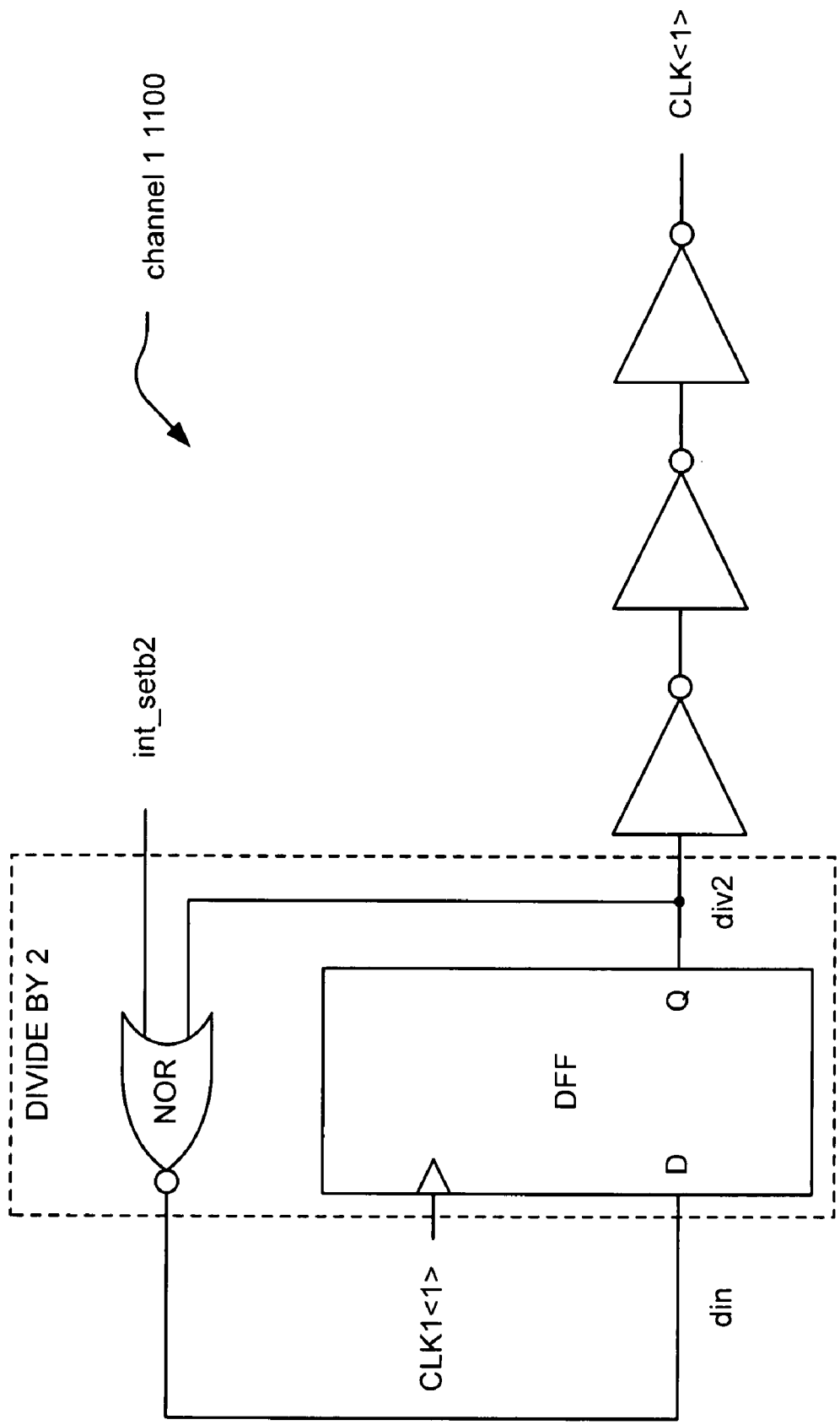
FIG. 11 and FIG. 12 illustrate embodiments of modules, devices, and/or functional blocks employed in the generation of a second clock signal within a system employing multiple channel synchronized clocks.
Figure 12:
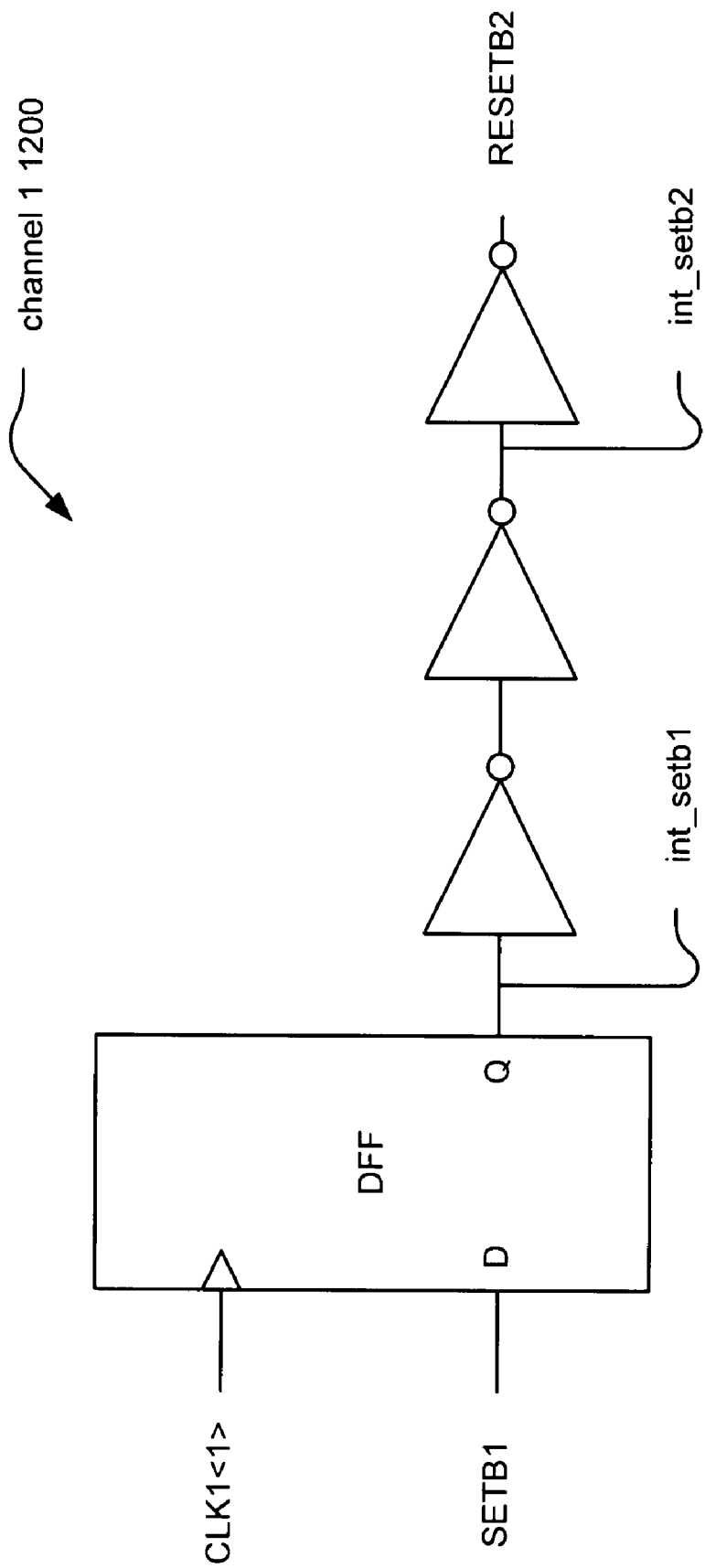

FIG. 11 and FIG. 12 illustrate embodiments 1100 and 1200, respectively, of modules, devices, and/or functional blocks employed in the generation of a second clock signal within a system employing multiple channel synchronized clocks. FIG. 11 and FIG. 12 are to be considered in conjunction with one another.

Referring to FIG. 11 and FIG. 12, a DFF is used to sample the SETB1 and generate "int_setb2". The signal "int_setb2" is used to initialize the DIVIDE BY 2 output signal, "div2". Inverted and delayed version of "int_setb2" is RESETB2, and it is sent to channel 2. CLK<1> is a delayed and inverted version of "div2", and it is sent as the clock output of channel 1. It is noted that a NOR gate is used in the feedback path of the DFF which is used for DIVIDE BY 2. This ensures the initial state of "div2" to be LOGIC 0 (LOW).

Figure 13:
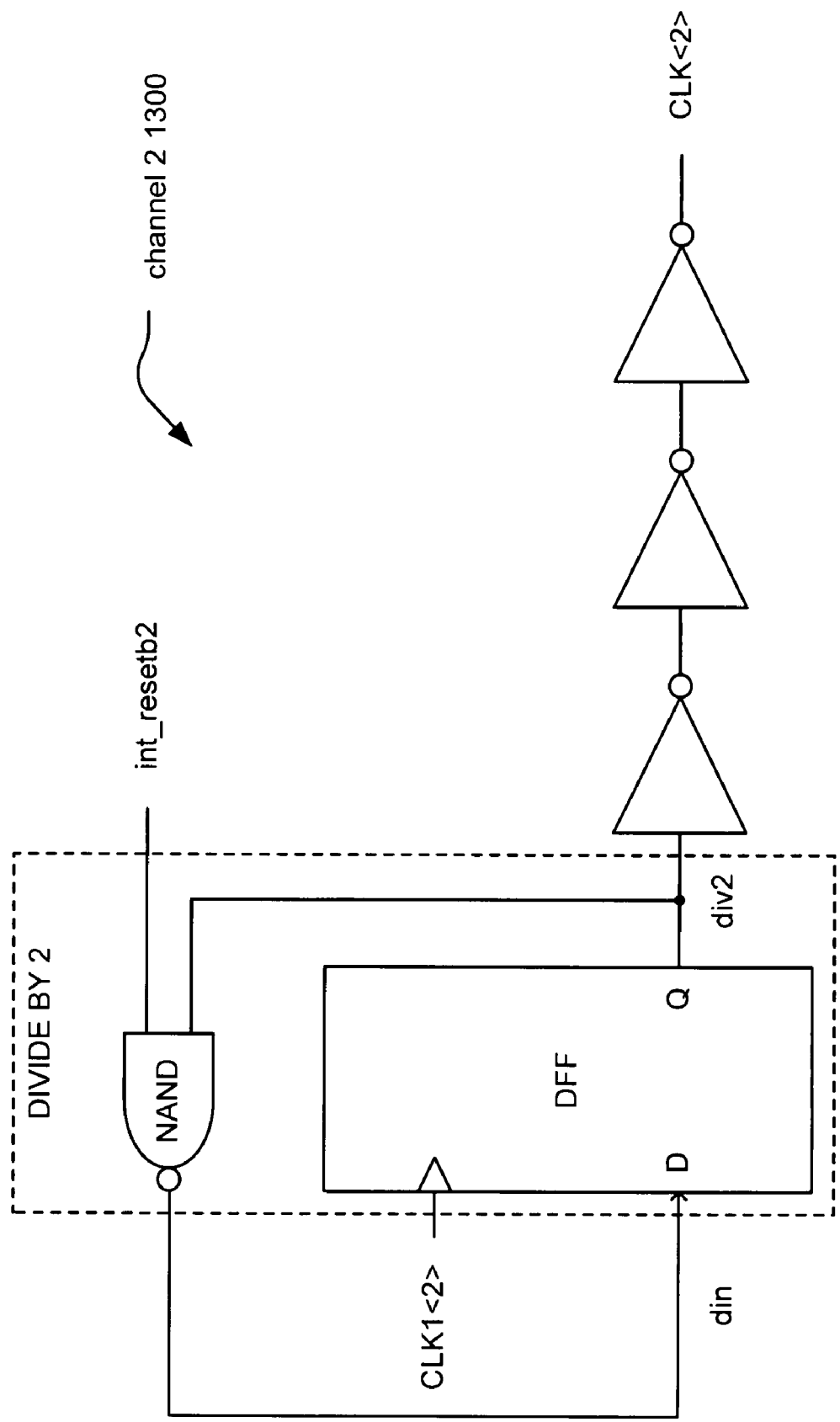
FIG. 13 and FIG. 14 illustrate embodiments of modules, devices, and/or functional blocks employed in the generation of a third clock signal within a system employing multiple channel synchronized clocks.
Figure 14:
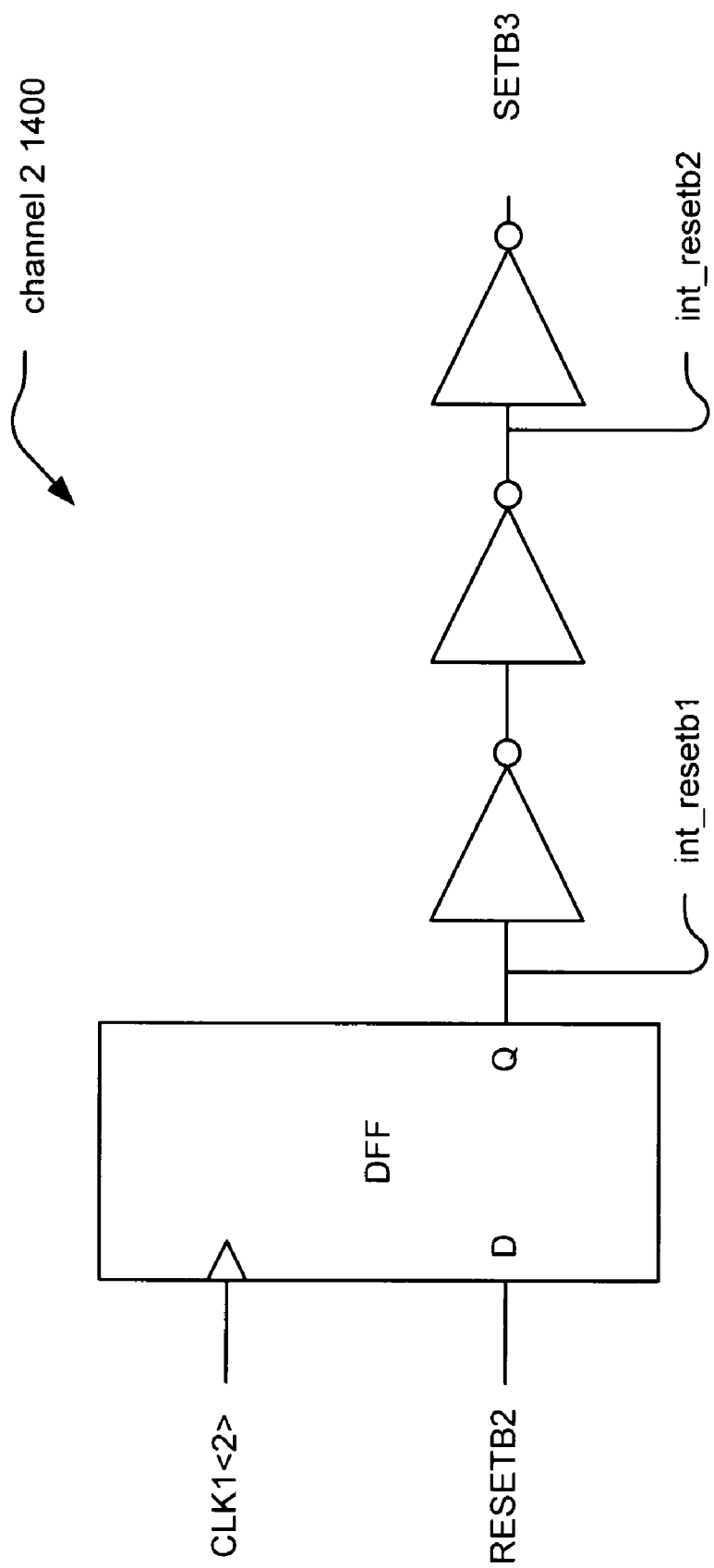

FIG. 13 and FIG. 14 illustrate embodiments 1300 and 1400, respectively, of modules, devices, and/or functional blocks employed in the generation of a third clock signal within a system employing multiple channel synchronized clocks. FIG. 13 and FIG. 14 are to be considered in conjunction with one another.

Referring to FIG. 13 and FIG. 14, a DFF is used to sample the RESETB2 and generate "int_resetb2". The signal "int_resetb2" is used to initialize the DIVIDE BY 2 output signal, "div2". Inverted and delayed version of "int_resetb2" is SETB3, and it is sent to channel 3. CLK<2> is a delayed and inverted version of "div2", and it is sent as the clock output of channel 3. It is noted that a NAND gate is used in the feedback path of the DFF which is used for DIVIDE BY 2. This ensures the initial state of "div2" to be LOGIC 1 (HIGH).

Using this approach as presented above, any number of channels can be constructed by utilizing these three major channels in alternating fashion. For example, an 8-channel system will look like as follows:

Channel<0> will use "channel 0" depicted in FIG. 9 and FIG. 10.

Channel<1> will use "channel 1" depicted in FIG. 11 and FIG. 12.

Channel<2> will use "channel 2" depicted in FIG. 13 and FIG. 14.

Channel<3> will use "channel 1" depicted in FIG. 11 and FIG. 12.

Channel<4> will use "channel 2" depicted in FIG. 13 and FIG. 14.

Channel<5> will use "channel 1" depicted in FIG. 11 and FIG. 12.

Channel<6> will use "channel 2" depicted in FIG. 13 and FIG. 14.

Channel<7> will use "channel 1" depicted in FIG. 11 and FIG. 12.

As can be seen, this feature and scalability helps enable the design to be modular to any number of channels.

Figure 15:
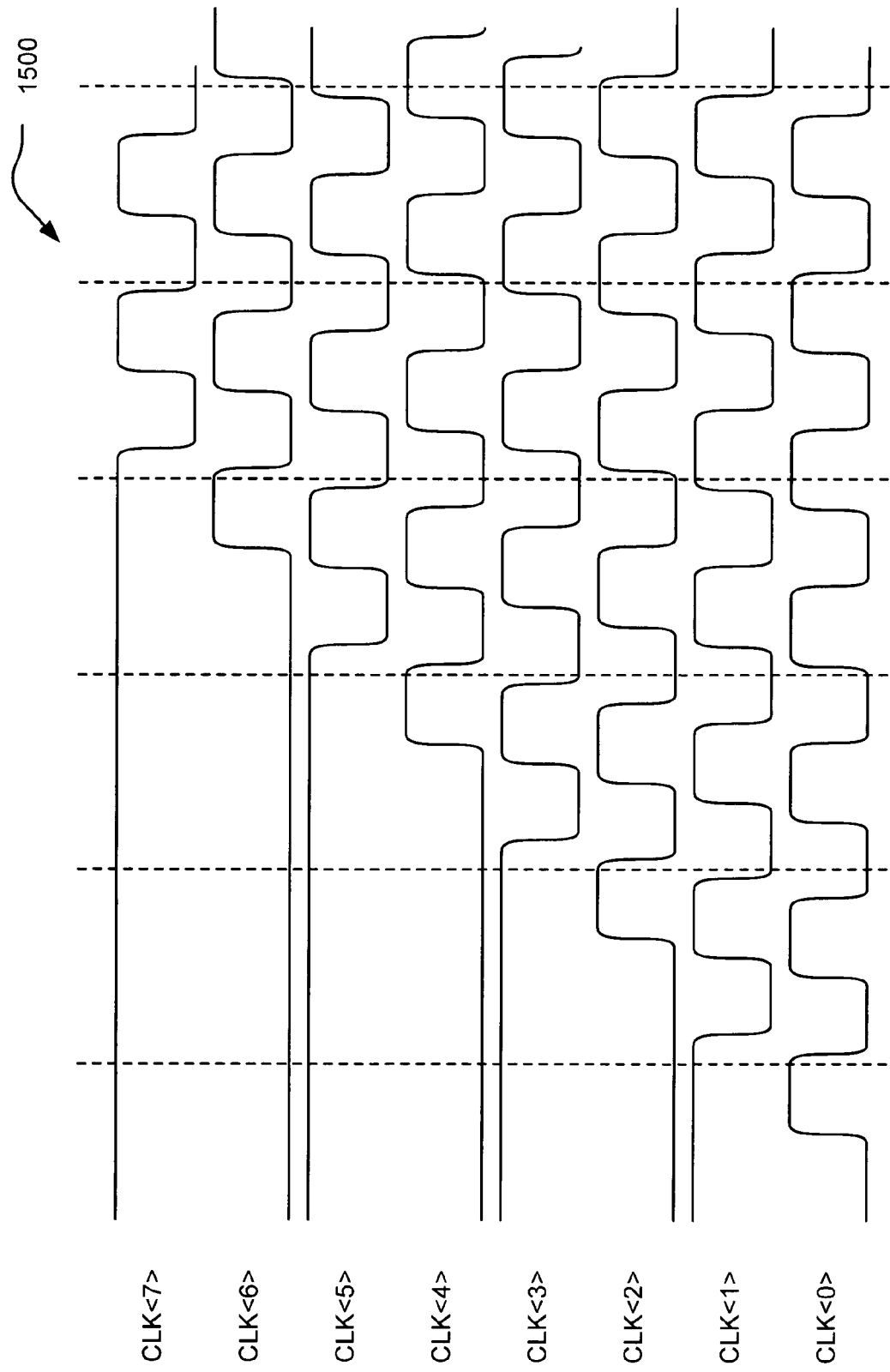
FIG. 15 illustrates an embodiment of timing relations, particularly depicting the starting timing relations, among various clock signals within a system employing multiple channel synchronized clocks.

FIG. 15 illustrates an embodiment of timing relations 1500, particularly depicting the starting timing relations, among various clock signals within a system employing multiple channel synchronized clocks.

In this particular embodiment and diagram, the starting scheme of signals CLK<0:7> for an 8-channel system is depicted. It is noted that each channel clock output starts half of a cycle later with an opposite initial condition compared to the previous channel clock output. It is also noted that any number of channels, including an odd number of channels or an even number of channels, can be employed using various aspects of the novel multiple channel synchronized clock generation scheme presented herein.

Figure 16:
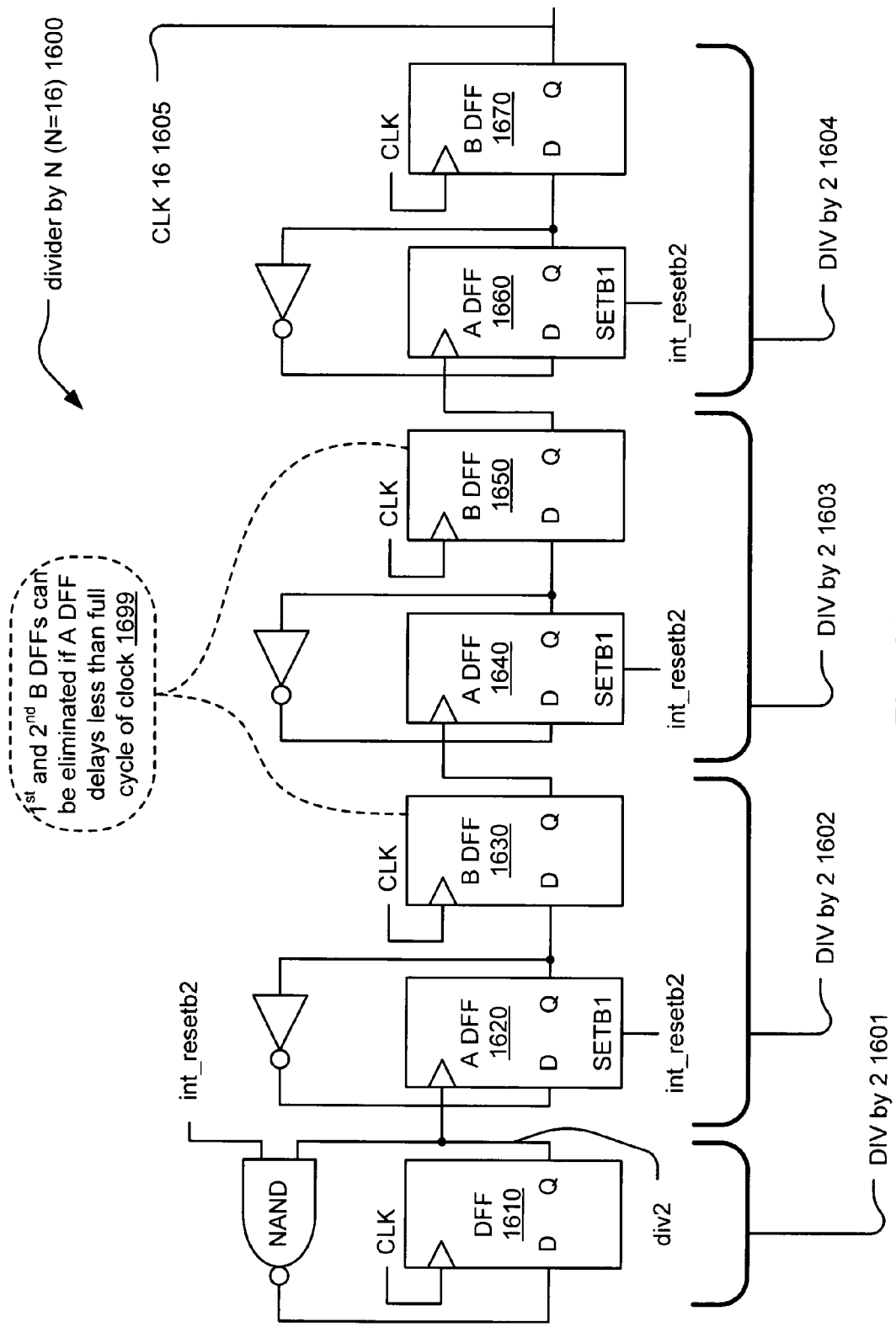
FIG. 16 illustrates an embodiment of a divider by 'm' module, where m=16, as can be employed in conjunction with FIG. 10.

FIG. 16 illustrates an embodiment of a divider by 'm' module 1600, where m=16, as can be employed in conjunction with FIG. 10. In some instances, it may be desirable to have one or some of the channels operating at a lower (in some cases, much lower) frequency than the other channels. For example, such a channel could be employed to perform monitoring of environmental changes and signal quality, and such a channel may not need to operate at the high frequency of the others. Other benefits can also be achieved when operating at a lower operating frequency including lower power consumption. However, it is still noted that this lower frequency operating channel should be synchronous with the other channels that operate at the higher frequency.

This divider by 'm' module 1600 employs a number of digital flip-flops (depicted as DFF in the diagram) to effectuate a divider by 'm' operation. In this particular embodiment, m=16, but clearly other values of division can be employed without departing from the scope and spirit of the invention.

This divider by 'm' module 1600 can be employed in conjunction with the embodiment of FIG. 10, which operates using the signal, "int_resetb2". This embodiment employs a NAND gate to operate in accordance with the int_resetb2 signal as employed within FIG. 10.

A clock signal (shown as "CLK") is provided to a first DFF 1610; this DFF 1610 also feeds its output back to a NAND gate where its signal is NAND-ed with "int_resetb2" as well as provided as the clock signal input to the next DFF in the chain, namely A DFF 1620.

The signal "int_resetb2" is also provided to A DFF 1620 to trigger the signal "SETB1" therein. The operation of DFF 1610 performs a "divide by 2" operation, as depicted by reference numeral 1601.

The output of A DFF 1620 is fed back to the A DFF 1620 via an inverter, and the output of A DFF 1620 is also provided as an input to B DFF 1630.

The output of B DFF 1630 is provided as the clock signal input to the next DFF in the chain, namely A DFF 1640. The B DFF 1630 is also clocked using the clock signal (shown as "CLK"). The cooperative operation of A DFF 1620 and B DFF 1630 is to perform a "divide by 2" operation, as depicted by reference numeral 1602.

The signal "int_resetb2" is also provided to A DFF 1640 to trigger the signal "SETB1" therein. The output of A DFF 1640 is fed back to the A DFF 1640 via an inverter, and the output of A DFF 1640 is also provided as an input to B DFF 1650. The output of B DFF 1650 is provided as the clock signal input to the next DFF in the chain, namely A DFF 1660. The B DFF 1650 is also clocked using the clock signal (shown as "CLK"). The cooperative operation of A DFF 1640 and B DFF 1650 is to perform a "divide by 2" operation, as depicted by reference numeral 1603.

The signal "int_resetb2" is also provided to A DFF 1660 to trigger the signal "SETB1" therein. The output of A DFF 1660 is fed back to the A DFF 1660 via an inverter, and the output of A DFF 1660 is also provided as an input to B DFF 1670. The output of B DFF 1670 is the divided down clock signal, shown as CLK 16 with reference numeral 1605. The B DFF 1670 is also clocked using the clock signal (shown as "CLK"). The cooperative operation of A DFF 1660 and B DFF 1670 is to perform a "divide by 2" operation, as depicted by reference numeral 1604.

The cooperation of 4 separate "divide by 2" operations is to effectuate a "divide by 16" operation.

It is also noted that if the delays of the $1^{st}$ and $2^{nd}$ A DFFs (i.e., A DFF 1620 and A DFF 1640) are much less than a full cycle of the clock signal (shown as "CLK"), then the B DFFs (i.e., B DFF 1630 and B DFF 1650) can be eliminated, as depicted by reference numeral 1699. The final B DFF 1670 should remain, however.

Figure 17:
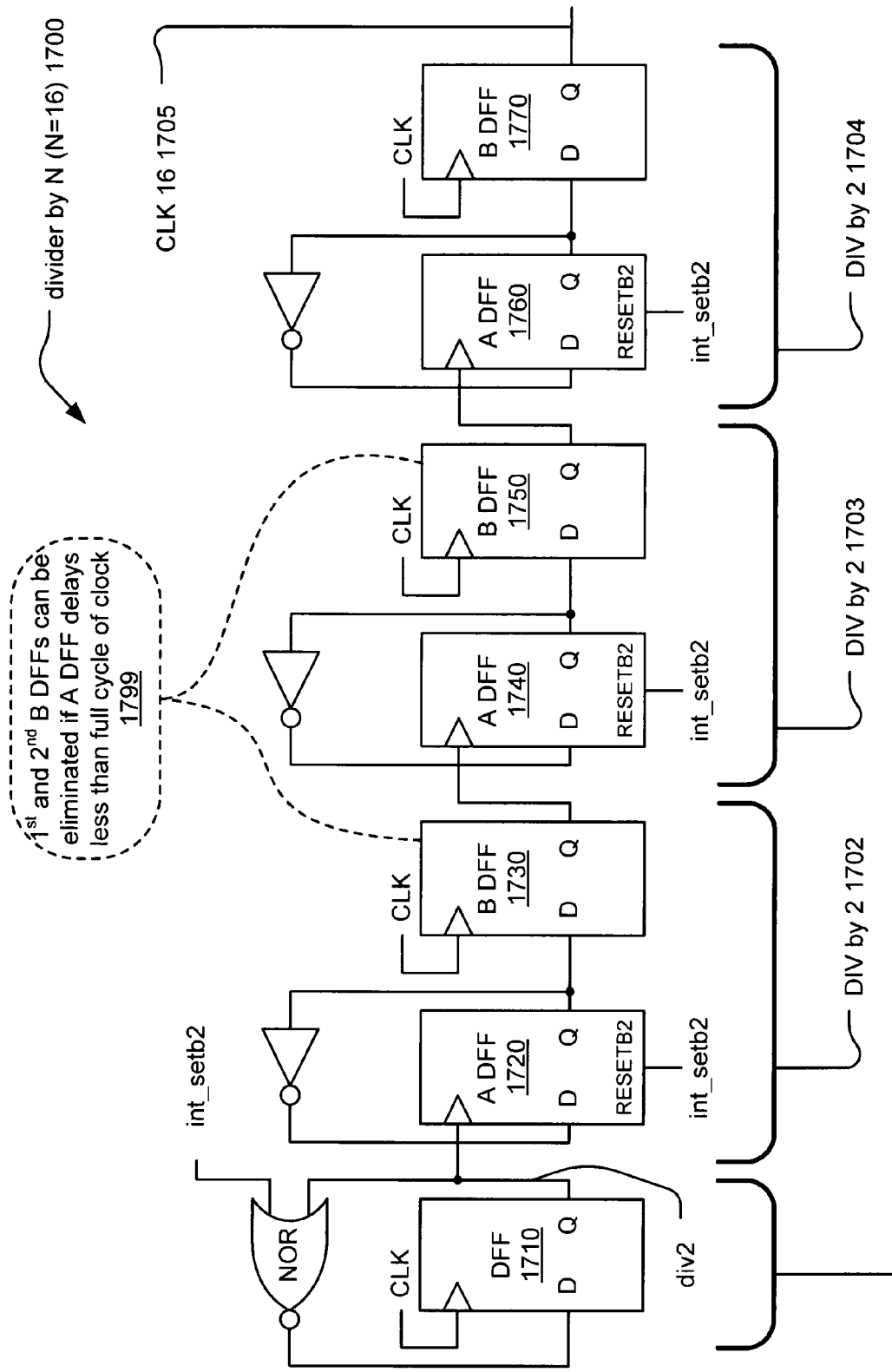
FIG. 17 illustrates an embodiment of a divider by 'm' module, where m=16, as can be employed in conjunction with FIG. 12.

FIG. 17 illustrates an embodiment of a divider by 'm' module 1700, where m=16, as can be employed in conjunction with FIG. 12. This embodiment is very analogous to the previous embodiment, with a difference being that this divider by 'm' module 1700 can be employed in conjunction with the embodiment of FIG. 12, which operates using the signal, "int_setb2". This embodiment employs a NOR gate to operate in accordance with the "int_setb2" signal as employed within FIG. 12.

A clock signal (shown as "CLK") is provided to a first DFF 1710; this DFF 1710 also feeds its output back to a NOR gate where its signal is NOR-ed with "int_setb2" as well as provided as the clock signal input to the next DFF in the chain, namely A DFF 1720.

The signal "int_setb2" is also provided to A DFF 1720 to trigger the signal "RESETB2" therein. The operation of DFF 1710 performs a "divide by 2" operation, as depicted by reference numeral 1701.

The output of A DFF 1720 is fed back to the A DFF 1720 via an inverter, and the output of A DFF 1720 is also provided as an input to B DFF 1730.

The output of B DFF 1730 is provided as the clock signal input to the next DFF in the chain, namely A DFF 1740. The B DFF 1730 is also clocked using the clock signal (shown as "CLK"). The cooperative operation of A DFF 1720 and B DFF 1730 is to perform a "divide by 2" operation, as depicted by reference numeral 1702.

The signal "int_setb2" is also provided to A DFF 1740 to trigger the signal "RESETB2" therein. The output of A DFF 1740 is fed back to the A DFF 1740 via an inverter, and the output of A DFF 1740 is also provided as an input to B DFF 1750. The output of B DFF 1750 is provided as the clock signal input to the next DFF in the chain, namely A DFF 1760. The B DFF 1750 is also clocked using the clock signal (shown as "CLK"). The cooperative operation of A DFF 1740 and B DFF 1750 is to perform a "divide by 2" operation, as depicted by reference numeral 1703.

The signal "int_setb2" is also provided to A DFF 1760 to trigger the signal "RESETB2" therein. The output of A DFF 1760 is fed back to the A DFF 1760 via an inverter, and the output of A DFF 1760 is also provided as an input to B DFF 1770. The output of B DFF 1770 is the divided down clock signal, shown as CLK 17 with reference numeral 1705. The B DFF 1770 is also clocked using the clock signal (shown as "CLK"). The cooperative operation of A DFF 1760 and B DFF 1770 is to perform a "divide by 2" operation, as depicted by reference numeral 1704.

The cooperation of 4 separate "divide by 2" operations is to effectuate a "divide by 16" operation.

It is also noted that if the delays of the $1^{st}$ and $2^{nd}$ A DFFs (i.e., A DFF 1720 and A DFF 1740) are much less than a full cycle of the clock signal (shown as "CLK"), then the B DFFs (i.e., B DFF 1730 and B DFF 1750) can be eliminated, as depicted by reference numeral 1799. The final B DFF 1770 should remain, however.

These embodiments depicted in FIG. 16 and FIG. 17 show just one possible version by which a "divide by 'm'" operation can be implemented. It is noted that other embodiments may also be employed to perform a "divide by 'm'" operation without departing from the scope and spirit of the invention.

It is also noted that although many of the previous embodiments operate in accordance with digital implementation, it is understood that the principles presented herein in accordance with certain aspects of the invention can also be readily applied to analog implementation.

Figure 18:
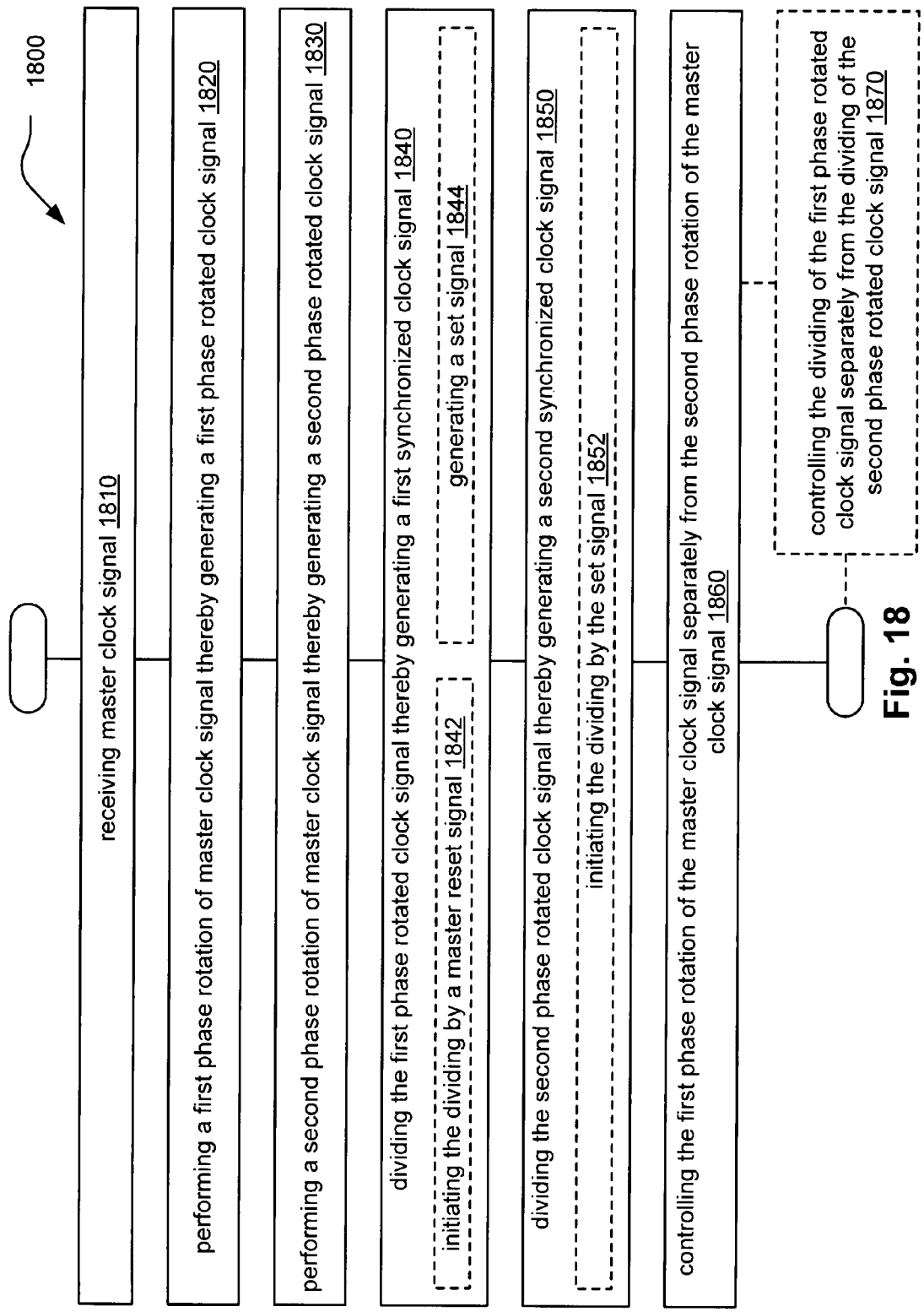
FIG. 18 illustrates an embodiment of a method for generating a plurality of synchronized clock signals.

FIG. 18 illustrates an embodiment of a method 1800 for generating a plurality of synchronized clock signals.

As shown in a block 1810, the method 1800 begins by receiving a master clock signal. Then, as shown in a block 1820, the method 1800 continues by performing a first phase rotation of the master clock signal thereby generating a first phase rotated clock signal. The method 1800 continues by performing a second phase rotation of the master clock signal thereby generating a second phase rotated clock signal as shown in a block 1830.

The method 1800 continues by dividing the first phase rotated clock signal thereby generating a first synchronized clock signal of a plurality of synchronized clock signals as shown in a block 1830. This operation of the block 1840 can be initiated by an asynchronous master reset signal, as shown in a block 1842. This operation of the block 1840 can also involve generating a set signal, as shown in a block 1844.

The method 1800 continues by dividing the second phase rotated clock signal, as initiated by the set signal, thereby generating a second synchronized clock signal of the plurality of synchronized clock signals as shown in a block 1850. This operation of the block 1850 can be initiated by the set signal, as shown in a block 1852.

The method 1800 continues by controlling the first phase rotation of the master clock signal separately from the second phase rotation of the master clock signal as shown in a block 1860.

In some embodiments, the method 1800 also includes controlling the dividing of the first phase rotated clock signal separately from the dividing of the second phase rotated clock signal as shown in a block 1870.

There are a variety of advantages of the means for multiple channel synchronized clock generation presented herein. For example, this novel approach of multiple channel synchronized clock generation offers a great deal of flexibility thanks in large part to using dedicated and independently controlled phase rotators for each of the channels. Using dedicated and independently controlled phase rotators can be operable to substantially reduce (or eliminate completely) the delay mismatches among the clock outputs.

This novel approach of multiple channel synchronized clock generation can provide for elimination of duty cycle distortion by using divider circuits (e.g., DIVIDE BY 'm', which can be DIVIDE BY 2 in some embodiments, where m=2) to generate the output clock.

The novel approach of multiple channel synchronized clock generation presented herein is also easily scalable to accommodate any number of channels including either an odd or an even number of channels. Generally speaking, this novel approach of multiple channel synchronized clock generation can be applied to any number of channels. Using dedicated phase rotators, one can adjust the required delay among CLK1<0:N> where N is the number of channels. Then, the synchronization scheme can be easily applied to any number of channels.

If a DIVIDE BY 'm' circuitry (which can be DIVIDE BY 2 in some embodiments, where m=2) is employed at each channel, considering any number of channels that need to be synchronized, the maximum operation frequency will still be 2/T independent of number of channels. This does not require any high speed samplers which can increase the current consumption.

Figure 4:
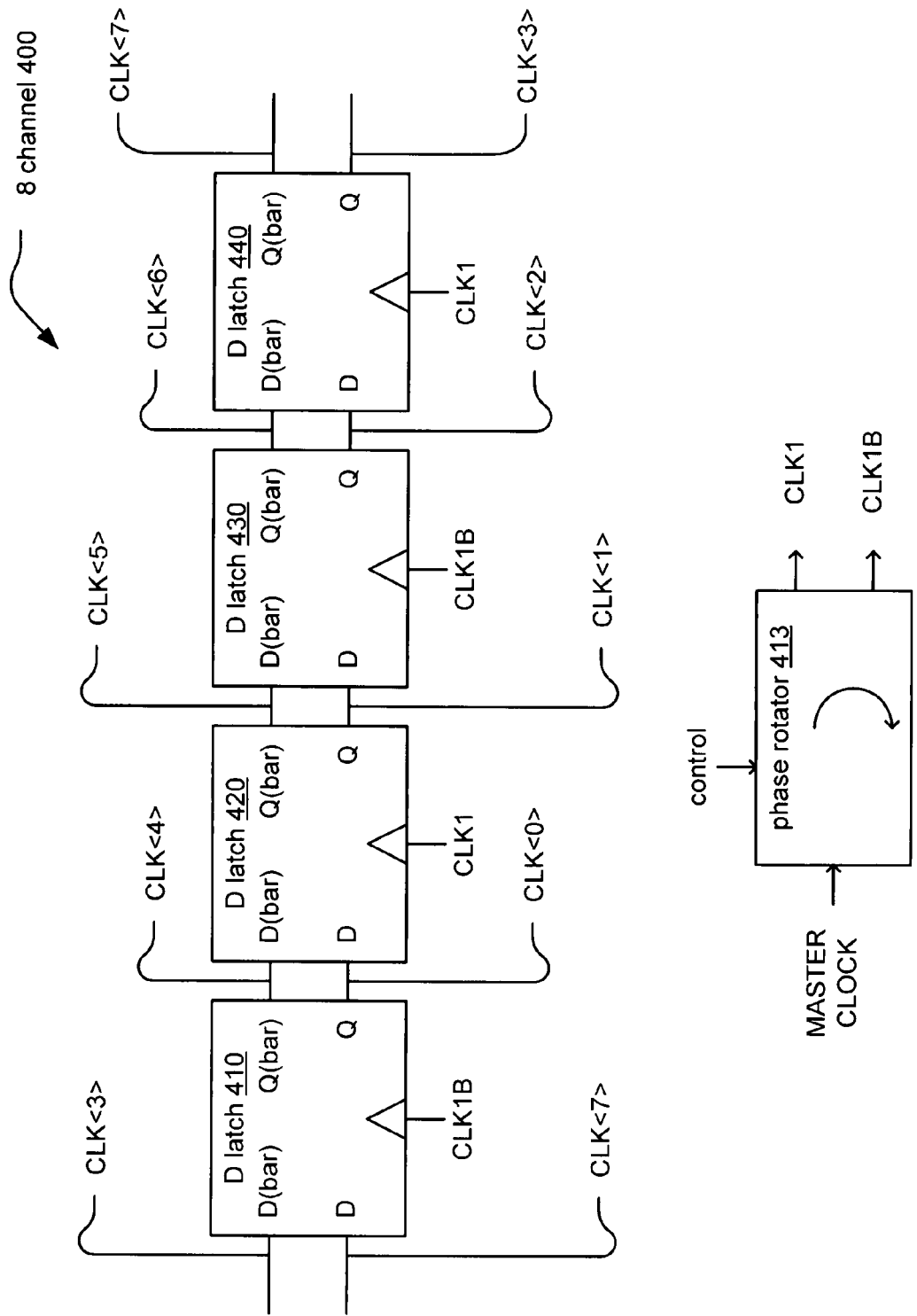
FIG. 4 illustrates a prior art approach of synchronized clock signal generation for 8 channels.

Certain advantages of the novel approach of multiple channel synchronized clock generation can also be readily identified when comparing to the prior art approach 400 of FIG. 4. Such a prior art scheme (e.g., as within FIG. 4) does not have the flexibility of controlling the phase of the clock output for each channel. Thus, one of many possible deleterious effects which can result is the delay mismatches among the clock outputs. This prior art approach 400 provides no means by which these delay mismatches among the clock outputs can be corrected.

Moreover, since no divider circuit is employed at the output of each channel within such a prior art scheme (e.g., as within FIG. 4), the duty cycle distortion will not be eliminated. If it is desirable to include a divide by "m" (e.g., where m=2 in some embodiments) at each channel, then this requires a synchronization scheme to align the clock outputs. In such an implementation, the operation speed has to be doubled compared to that depicted within the novel approach of multiple channel synchronized clock generation presented herein.

In addition, such a prior art scheme (e.g., as within FIG. 4) works only for an 8-channel system where the clock signals CLK1<0:7> are double the speed of clock signals CLK<0:7>. It is not modular to any number of channels, and it certainly cannot accommodate an odd number of channels.

There are certain functionalities and capabilities provided by the novel approach of multiple channel synchronized clock generation presented herein; some of these are enumerated below.

At each channel, having dedicated phase rotators provides a great deal of flexibility and capability of independently controlling phase of the clock output of each channel.

At each channel, having dedicated phase rotators provides the ability to eliminate the delay mismatches among the clock outputs of the channels.

At each channel, having dedicated dividers (DIVIDE BY 'm's) provides the ability to eliminate the duty cycle distortion caused by phase rotators, differential to CMOS converters, and additional intermittent buffer stages.

Certain operations and relationships of the MASTER RESET, SET, and RESET signals are also enumerated below.

At channel 0, a MASTER RESETB is used to reset the divider in channel 0 and generate a SETB1 signal for channel 1.

At channel 1, the SETB1 from channel 0 is used to set the divider in channel 1 and generate a RESETB2 signal for channel 2.

At channel 2, the RESETB2 from channel 1 is used to reset the divider in channel 2 and generate a SETB3 signal for channel 3.

At channel k, using a SETB(k) or RESETB(k) from channel (k−1) is used to set or reset the divider in channel (k) and generate a RESETB(k+1) or SETB(k+1) for channel (k+1), respectively.

RESETTING or SETTING is employed in an alternating fashion between two adjacent channels in order to initialize the clock output of each channel operates to provide synchronized multiple channel clock outputs.

NAND or NOR gate in the feedback section of the DIVIDER circuit is used in an alternating fashion between two adjacent channels in order to initialize the clock output of each channel provides synchronized multiple channel clock outputs.

It is a modular scheme that can be applied to any number of channels, and can accommodate both odd and even numbers of channels.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A communication device that is operable to generate a plurality of synchronized clock signals, comprising:
   an input that is operable to receive a master clock signal;
   a plurality of phase rotators that includes a first phase rotator and a second phase rotator, wherein:
      the master clock signal is provided to each phase rotator of the plurality of phases rotators;
      the first phase rotator is operable to perform a first phase rotation of the master clock signal thereby generating a first phase rotated clock signal; and
      the second phase rotator is operable to perform a second phase rotation of the master clock signal thereby generating a second phase rotated clock signal; and
   a plurality of dividers, wherein:
      a first divider of the plurality of dividers is operable to process the first phase rotated clock signal and an asynchronous master reset signal thereby generating a first synchronized clock signal of the plurality of synchronized clock signals and a set signal; and
      a second divider of the plurality of dividers is operable to process the second phase rotated clock signal and the set signal thereby generating a second synchronized clock signal of the plurality of synchronized clock signals.

2. The communication device of claim 1, wherein:
   the second divider of the plurality of dividers is operable to process the second phase rotated clock signal and the set signal thereby generating the second synchronized clock signal of the plurality of synchronized clock signals and a reset signal; and
   the reset signal is provided to a third divider of the plurality of dividers.

3. The communication device of claim 1, wherein:
   the set signal is a first set signal;
   the first divider of the plurality of dividers is operable to process the first phase rotated clock signal and the asynchronous master reset signal thereby generating the first synchronized clock signal of the plurality of synchronized clock signals and the first set signal;
   the second divider of the plurality of dividers is operable to process the second phase rotated clock signal and the first set signal thereby generating the second synchronized clock signal of the plurality of synchronized clock signals and a first reset signal;
   a third divider of the plurality of dividers is operable to process a third phase rotated clock signal, output from a third phase rotator of the plurality of phase rotators, and the first reset signal thereby generating a third synchronized clock signal of the plurality of synchronized clock signals and a second set signal; and
   a fourth divider of the plurality of dividers is operable to process a fourth phase rotated clock signal, output from a fourth phase rotator of the plurality of phase rotators, and the second reset signal thereby generating a fourth synchronized clock signal of the plurality of synchronized clock signals and a second reset signal that is provided to a fifth divider of the plurality of dividers.

4. The communication device of claim 1, wherein:
the plurality of phase rotators is a programmable plurality of phase rotators; and
each phase rotator of the plurality of phases rotators is operable to receive a corresponding control signal that directs that particular phase rotator to perform its corresponding phase rotation of the master clock signal.

5. The communication device of claim 1, wherein:
the plurality of dividers is a programmable plurality of dividers; and
each divider of the plurality of dividers is operable to receive a corresponding control signal that governs a divisor employed by that particular divider to divide the phase rotated clock signal that it receives.

6. The communication device of claim 1, wherein:
the plurality of dividers is operable to reduce or eliminate any duty cycle distortion within a plurality of phase rotated clock signals that is caused by the plurality of phase rotators.

7. The communication device of claim 1, wherein:
each divider of the plurality of dividers employs a divisor of 2.

8. The communication device of claim 1, wherein:
the plurality of synchronized clock signals includes an odd number of synchronized clock signals.

9. The communication device of claim 1, wherein:
the communication device is a deserializer that is operable to receive an input signal having a first frequency and to deserialize the input signal into a plurality of deserialized input signals, each signal of the plurality of deserialized input signals has a second frequency that is lower than the first frequency;
the communication device includes a plurality of channels that is operable to employ parallel processing to process the plurality of deserialized input signals at the second frequency; and
the plurality of synchronized clock signals is provided to the plurality of channels such that each channel of the plurality of channels receives one synchronized clock signal of the plurality of synchronized clock signals.

10. The communication device of claim 1, wherein:
the communication device is implemented within at least one of a satellite communication system, a wireless communication system, a wired communication system, and a fiber-optic communication system.

11. A communication device that is operable to generate a plurality of synchronized clock signals, comprising:
an input that is operable to receive a master clock signal;
a programmable plurality of phase rotators that includes a first phase rotator and a second phase rotator, wherein:
the master clock signal is provided to each phase rotator of the plurality of phases rotators;
the first phase rotator is operable to perform a first phase rotation of the master clock signal thereby generating a first phase rotated clock signal;
the second phase rotator is operable to perform a second phase rotation of the master clock signal thereby generating a second phase rotated clock signal;
each phase rotator of the programmable plurality of phases rotators is operable to receive a first corresponding control signal that directs that particular phase rotator to perform its corresponding phase rotation of the master clock signal; and
a programmable plurality of dividers, wherein:
a first divider of the plurality of dividers is operable to process the first phase rotated clock signal and an asynchronous master reset signal thereby generating a first synchronized clock signal of the plurality of synchronized clock signals and a set signal;
a second divider of the plurality of dividers is operable to process the second phase rotated clock signal and the set signal thereby generating a second synchronized clock signal of the plurality of synchronized clock signals; and
each divider of the programmable plurality of dividers is operable to receive a second corresponding control signal that governs a divisor employed by that particular divider to divide the phase rotated clock signal that it receives.

12. The communication device of claim 11, wherein:
the programmable plurality of dividers is operable to reduce or eliminate any duty cycle distortion within a plurality of phase rotated clock signals that is caused by the programmable plurality of phase rotators.

13. The communication device of claim 11, wherein:
each divider of the programmable plurality of dividers employs a divisor of 2.

14. The communication device of claim 11, wherein:
the plurality of synchronized clock signals includes an odd number of synchronized clock signals.

15. The communication device of claim 11, wherein:
the communication device is a deserializer that is operable to receive an input signal having a first frequency and to deserialize the input signal into a plurality of deserialized input signals, each signal of the plurality of deserialized input signals has a second frequency that is lower than the first frequency;
the communication device includes a plurality of channels that is operable to employ parallel processing to process the plurality of deserialized input signals at the second frequency; and
the plurality of synchronized clock signals is provided to the plurality of channels such that each channel of the plurality of channels receives one synchronized clock signal of the plurality of synchronized clock signals.

16. The communication device of claim 11, wherein:
the communication device is implemented within at least one of a satellite communication system, a wireless communication system, a wired communication system, and a fiber-optic communication system.

17. A method for generating a plurality of synchronized clock signals within a communication device, the method comprising:
receiving a master clock signal;
performing a first phase rotation of the master clock signal thereby generating a first phase rotated clock signal;
performing a second phase rotation of the master clock signal thereby generating a second phase rotated clock signal;
dividing the first phase rotated clock signal, as initiated by an asynchronous master reset signal, thereby generating a first synchronized clock signal of a plurality of synchronized clock signals and a set signal;
dividing the second phase rotated clock signal, as initiated by the set signal, thereby generating a second synchronized clock signal of the plurality of synchronized clock signals; and
controlling the first phase rotation of the master clock signal separately from the second phase rotation of the master clock signal.

18. The method of claim 17, further comprising:
receiving an input signal having a first frequency;
deserializing the input signal into a plurality of deserialized input signals, each signal of the plurality of deserialized input signals has a second frequency that is lower than the first frequency;
employing parallel processing across a plurality of channels to process the plurality of deserialized input signals at the second frequency; and
providing the plurality of synchronized clock signals to the plurality of channels such that each channel of the plurality of channels receives one synchronized clock signal of the plurality of synchronized clock signals.

19. The method of claim 17, further comprising:
controlling the dividing of the first phase rotated clock separately from the dividing of the second phase rotated clock.

20. The method of claim 17, wherein:
the method is performed within a communication device; and
the communication device is implemented within at least one of a satellite communication system, a wireless communication system, a wired communication system, and a fiber-optic communication system.

* * * * *